(12) United States Patent
Fuglevand et al.

(10) Patent No.: US 6,428,918 B1
(45) Date of Patent: Aug. 6, 2002

(54) FUEL CELL POWER SYSTEMS, DIRECT CURRENT VOLTAGE CONVERTERS, FUEL CELL POWER GENERATION METHODS, POWER CONDITIONING METHODS AND DIRECT CURRENT POWER CONDITIONING METHODS

(75) Inventors: William A. Fuglevand; Jonathan Dodge, both of Spokane, WA (US)

(73) Assignee: Avista Laboratories, Inc., Spokane, WA (US)

( * ) Notice: Subject to any disclaimer, the term of this patent is extended or adjusted under 35 U.S.C. 154(b) by 0 days.

(21) Appl. No.: 09/544,781

(22) Filed: Apr. 7, 2000

(51) Int. Cl.$^7$ .......................... H01M 8/04; H01M 16/00
(52) U.S. Cl. ................ 429/13; 429/9; 429/22; 429/23; 320/101
(58) Field of Search ................ 429/9, 12, 13, 429/22, 23, 34; 320/101

(56) References Cited

U.S. PATENT DOCUMENTS

| | | |
|---|---|---|
| 3,432,356 A | 3/1969 | Christianson |
| 3,498,844 A | 3/1970 | Sanderson |
| 3,507,702 A | 4/1970 | Sanderson |
| 3,553,023 A | 1/1971 | Doyle |
| 3,623,913 A | 11/1971 | Adlhart et al. |
| 3,808,534 A | 4/1974 | Summers et al. ........... 340/249 |
| 3,823,358 A | 7/1974 | Rey |
| 3,964,930 A | 6/1976 | Reiser |
| 4,035,551 A | 7/1977 | Grevstad |
| 4,192,906 A | 3/1980 | Maru ........................... 429/13 |
| 4,435,252 A | 3/1984 | Kadiha |
| 4,467,018 A | 8/1984 | Schroll |
| 4,500,612 A | 2/1985 | Fujii et al. ..................... 429/26 |
| 4,510,211 A | 4/1985 | Struthers ...................... 429/18 |
| 4,670,702 A | 6/1987 | Yamada et al. ........... 429/23 X |
| 4,769,297 A | 9/1988 | Reiser ........................... 429/17 |
| 4,778,579 A * | 10/1988 | Levy et al. ............... 429/23 X |

(List continued on next page.)

FOREIGN PATENT DOCUMENTS

| | | |
|---|---|---|
| GB | 2129237 | 5/1984 |
| WO | WO98/42038 | 10/1998 |

OTHER PUBLICATIONS

Prater et al; Solid Polymer Fuel Cell Developments at Ballard; Journal of Power Sources; vol. 37 (1992), pp. 181–188.
Cairns et al.; Recent Advances in Fuel Cells and Their Application to New Hybrid Systems; Nov. 20, 1967; pp. 393–425.
Fuglevand et al, SN 09/322666, filed May 28, 1999.
Fuglevand et al, SN 09/108667, filed Jul. 1, 1998.
S/N: 09/322,666; Filed May 28, 1999; Fuel Cell Power Systems and Methods of Controlling A fuel Cell Power System; Amendment filed Jun. 4, 2001; Amendment filed Dec. 27, 2000; Pending Claims.
International Search Report; S/N PCT/US01/00546; Jul. 3, 2001; 6 pps.

Primary Examiner—Stephen Kalafut
(74) Attorney, Agent, or Firm—Wells St. John P.S.

(57) ABSTRACT

Fuel cell power systems, direct current voltage converters, fuel cell power generation methods, power conditioning methods and direct current power conditioning methods are provided. According to one aspect of the invention, a fuel cell power system includes a plurality of terminals adapted to couple with a load; a fuel cell configured to convert chemical energy into direct current electrical energy having a variable voltage potential; and a converter coupled intermediate the fuel cell and the terminals, the converter being configured to convert the direct current electrical energy having the variable voltage potential into direct current electrical energy having a substantially constant voltage potential.

57 Claims, 10 Drawing Sheets

U.S. PATENT DOCUMENTS

| | | | |
|---|---|---|---|
| 4,913,983 A | 4/1990 | Cheiky | 429/22 X |
| 4,961,151 A | 10/1990 | Early et al. | |
| 4,973,531 A | 11/1990 | Zaima et al. | |
| 4,994,331 A | 2/1991 | Cohen | 429/17 |
| 5,023,150 A | 6/1991 | Takabayshi | 429/22 |
| 5,045,414 A | 9/1991 | Bushnell et al. | 429/23 X |
| 5,047,298 A | 9/1991 | Perry, Jr. et al. | 429/17 |
| 5,109,186 A | 4/1992 | Lieu | |
| 5,154,986 A | 10/1992 | Takechi et al. | 429/23 |
| 5,156,928 A | 10/1992 | Takabayashi | |
| 5,192,627 A | 3/1993 | Perry, Jr. et al. | 429/17 |
| 5,200,278 A | 4/1993 | Watkins et al. | 429/24 |
| 5,200,279 A | 4/1993 | Draper et al. | 429/30 |
| 5,248,566 A | 9/1993 | Kumar et al. | 429/33 |
| 5,292,599 A | 3/1994 | Soma et al. | 429/30 |
| 5,304,430 A | 4/1994 | Ludwig | 429/17 |
| 5,306,574 A | 4/1994 | Singh et al. | 429/13 |
| 5,334,463 A | 8/1994 | Tajima et al. | |
| 5,336,570 A | 8/1994 | Dodge, Jr. | 429/31 |
| 5,338,622 A | 8/1994 | Hsu et al. | 429/26 |
| 5,344,721 A | 9/1994 | Sonai et al. | 429/20 |
| 5,354,626 A | 10/1994 | Kobayashi et al. | 429/30 |
| 5,358,799 A | 10/1994 | Gardner | 429/26 |
| 5,364,711 A | 11/1994 | Yamada et al. | 429/15 |
| 5,366,818 A | 11/1994 | Wilkinson et al. | 429/13 |
| 5,419,980 A | 5/1995 | Okamoto et al. | 429/32 |
| 5,470,671 A | 11/1995 | Fletcher et al. | 429/26 |
| 5,500,292 A | 3/1996 | Muranaka et al. | 429/209 |
| 5,502,629 A | 3/1996 | Ito et al. | |
| 5,519,312 A | 5/1996 | Wang et al. | |
| 5,532,072 A | 7/1996 | Spaeh et al. | 429/34 |
| 5,532,572 A | 7/1996 | Okamura | |
| 5,534,362 A | 7/1996 | Okamato et al. | 429/32 |
| 5,599,638 A | 2/1997 | Surampudi et al. | 429/33 |
| 5,607,785 A | 3/1997 | Tozawa et al. | |
| 5,658,681 A | 8/1997 | Sato et al. | |
| 5,680,027 A | 10/1997 | Hiratsku et al. | |
| 5,691,622 A | 11/1997 | Mack et al. | |
| 5,707,755 A | 1/1998 | Grot | |
| 5,714,874 A | 2/1998 | Bonnefoy | |
| 5,759,712 A | 6/1998 | Hockaday | 429/30 |
| 5,763,113 A | 6/1998 | Meltser et al. | 429/13 |
| 5,776,625 A | 7/1998 | Kaufman et al. | 429/30 |
| 5,780,981 A | 7/1998 | Sonntag et al. | |
| 5,798,186 A | 8/1998 | Fletcher et al. | 429/13 |
| 5,877,600 A | 3/1999 | Sonntag | 429/24 X |
| 5,925,322 A | 7/1999 | Werth | 422/170 |
| 5,931,658 A | 8/1999 | Sederquist et al. | 431/207 |
| 5,935,726 A | 8/1999 | Chow et al. | 429/13 |
| 5,985,474 A | 11/1999 | Chen et al. | |
| 6,001,499 A | 12/1999 | Grot et al. | 429/22 |
| 6,007,931 A | 12/1999 | Fuller et al. | 429/13 |
| 6,013,385 A | 1/2000 | Dubose | 429/24 X |
| 6,015,634 A | 1/2000 | Bonville, Jr. et al. | 429/17 |
| 6,030,718 A | 2/2000 | Fulevand et al. | 429/26 |
| 6,051,331 A | 3/2000 | Spear et al. | |
| 6,045,934 A | 4/2000 | Enami | 429/30 |
| 6,051,192 A | 4/2000 | Maston et al. | 422/110 |
| 6,093,500 A * | 7/2000 | Margiott et al. | 429/13 |
| 6,096,449 A | 8/2000 | Fugelvand et al. | 429/23 X |
| 6,194,095 B1 | 2/2001 | Hockaday | |
| 6,214,484 B1 | 4/2001 | Hauer | |
| 6,214,487 B1 | 4/2001 | Kelley et al. | |
| 6,242,120 B1 | 6/2001 | Herron | |

* cited by examiner

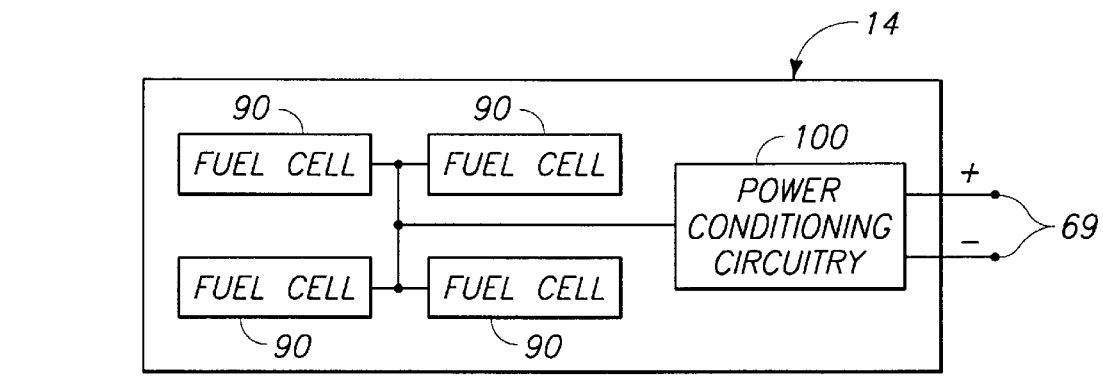
_FIG. 4_
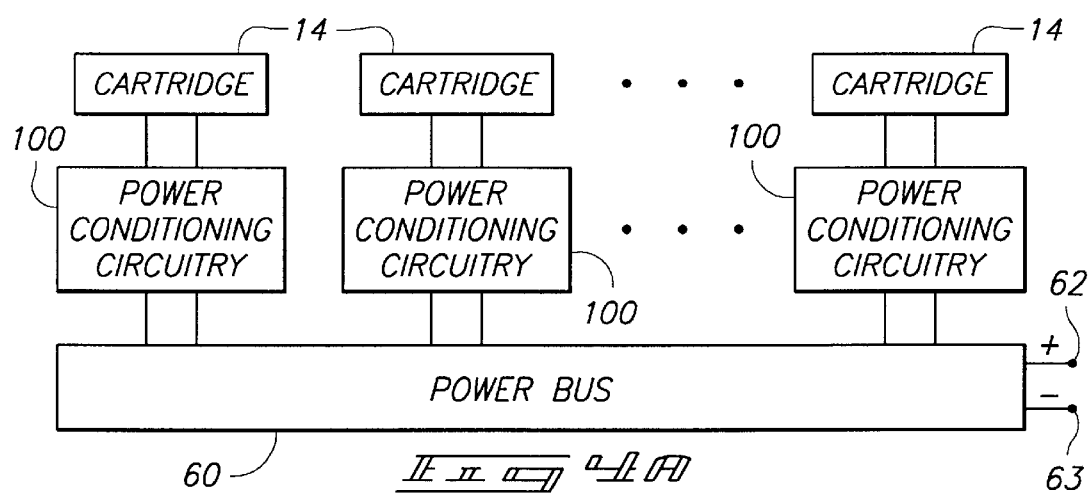
_FIG. 4A_
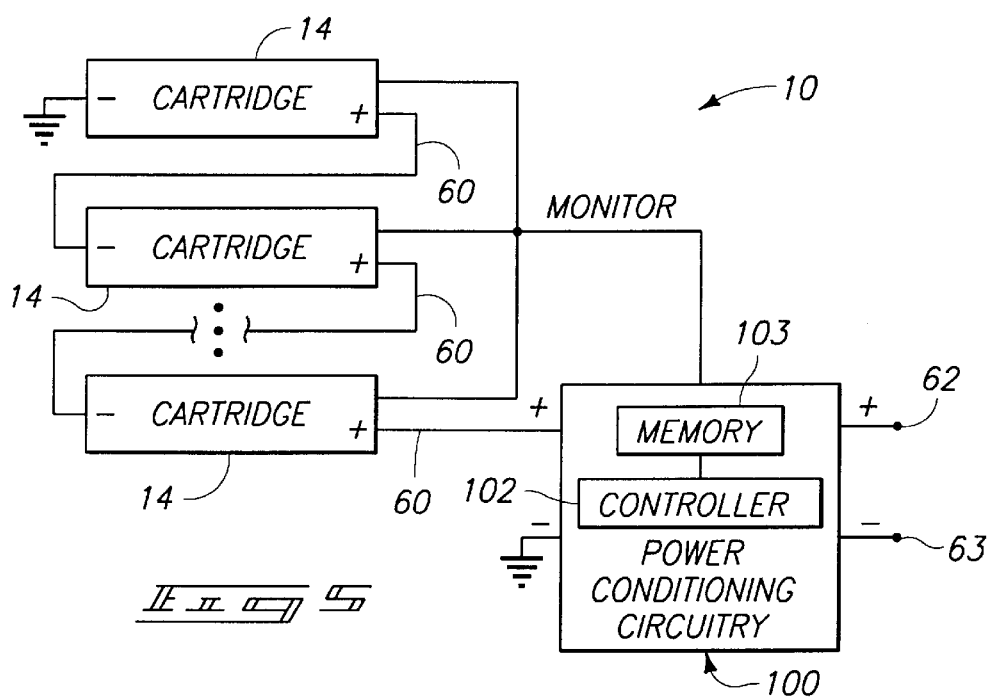
_FIG. 5_

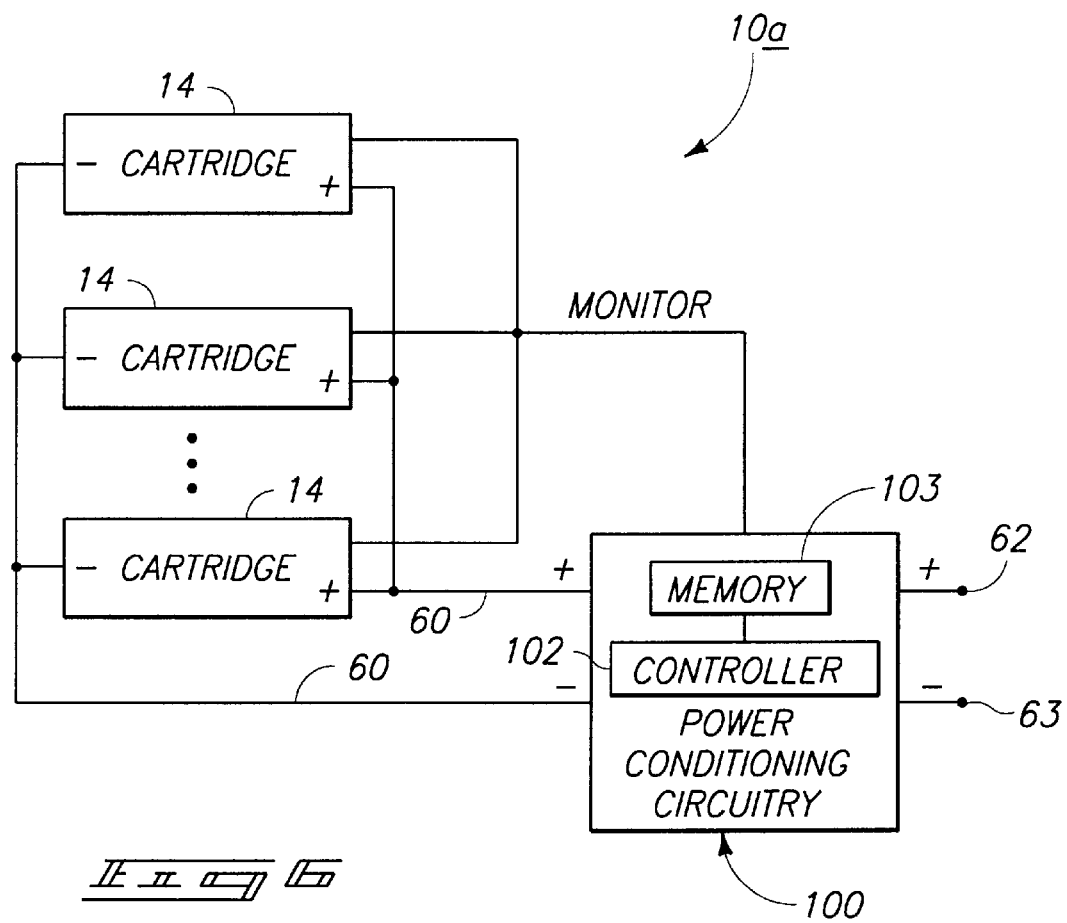
_Fig. 6_
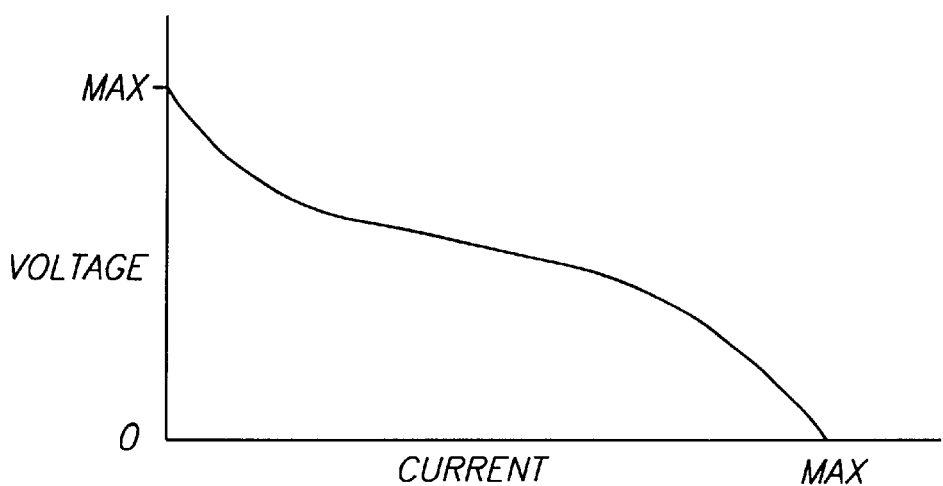
_Fig. 7_

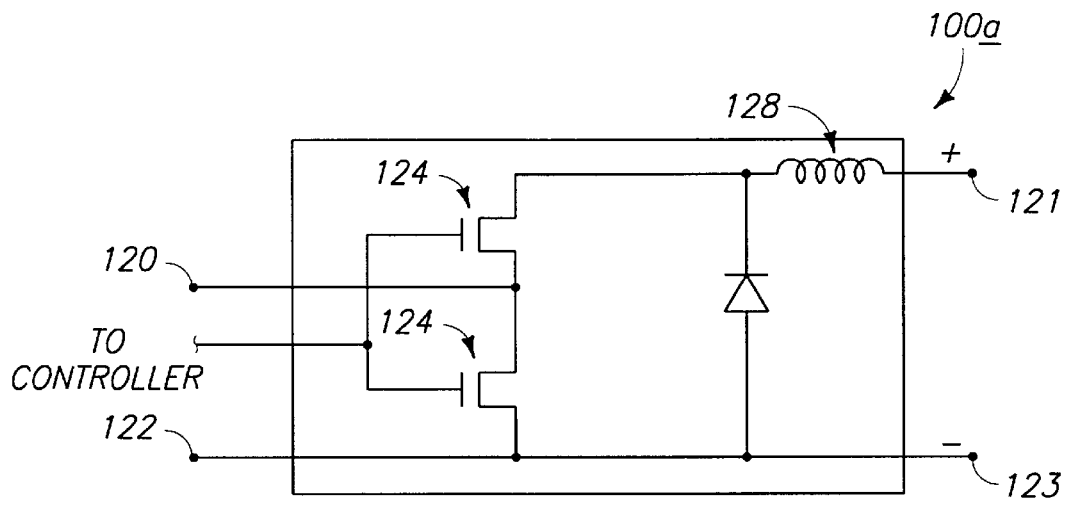
_FIG. 10_
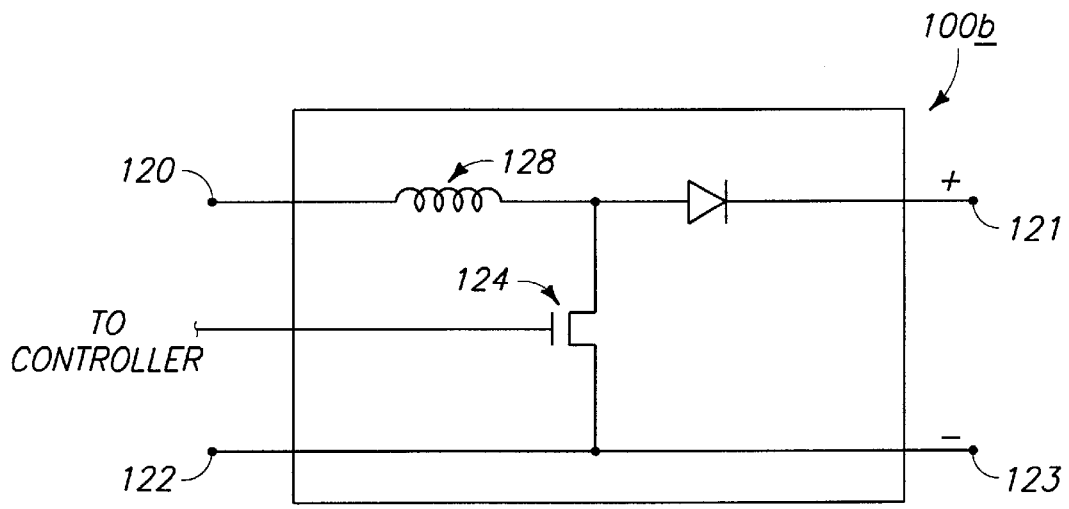
_FIG. 11_
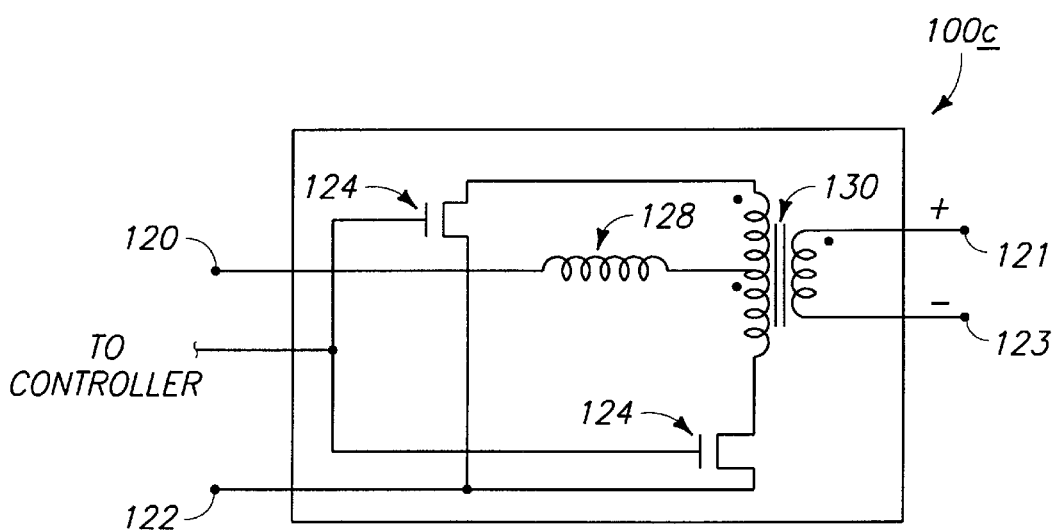
_FIG. 12_

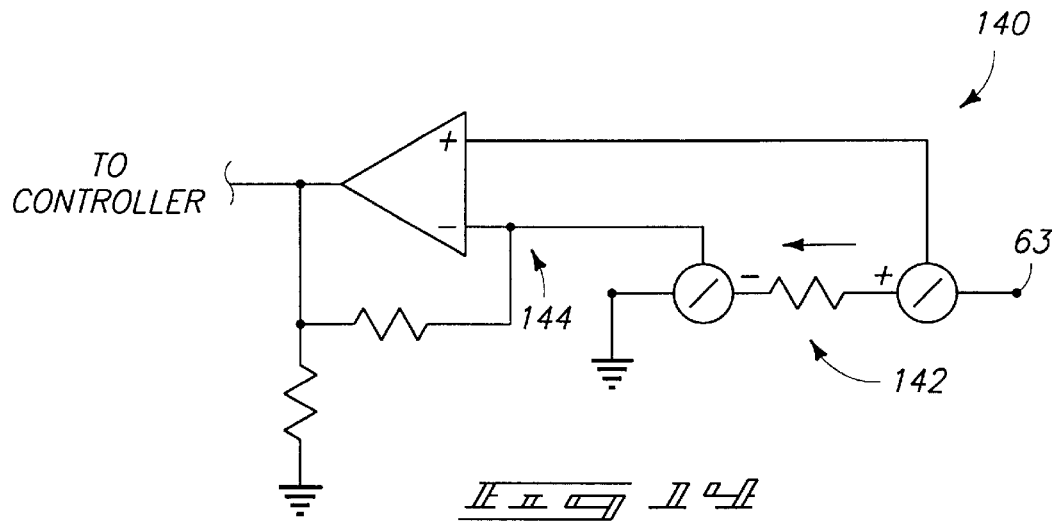
_Fig. 14_
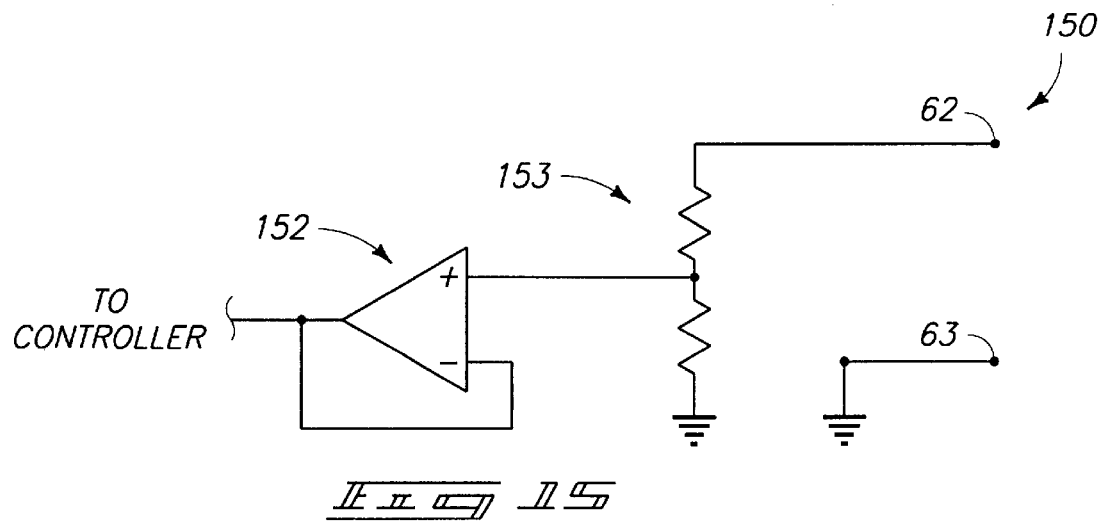
_Fig. 15_
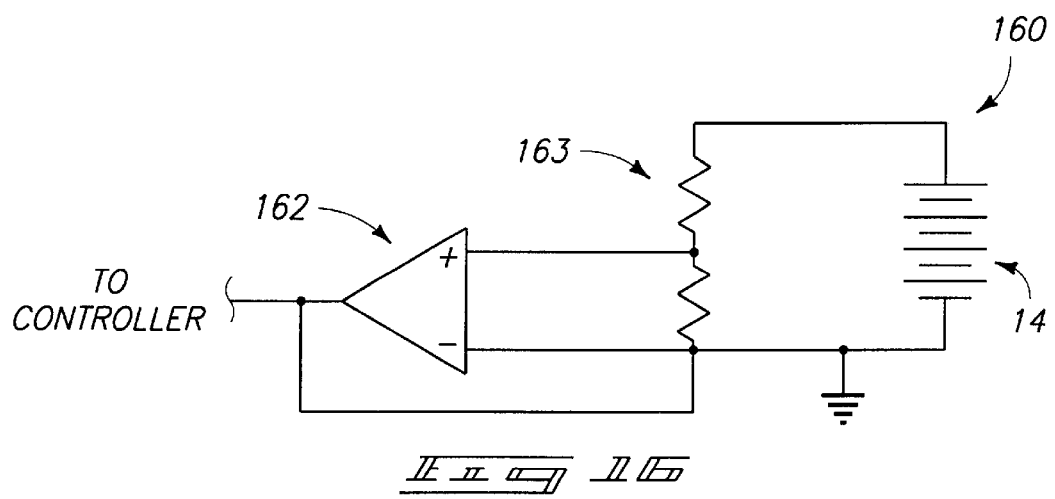
_Fig. 16_

FUEL CELL POWER SYSTEMS, DIRECT
CURRENT VOLTAGE CONVERTERS, FUEL
CELL POWER GENERATION METHODS,
POWER CONDITIONING METHODS AND
DIRECT CURRENT POWER
CONDITIONING METHODS

TECHNICAL FIELD

The present inventions relates to fuel cell power systems, direct current voltage converters, fuel cell power generation methods, power conditioning methods and direct current power conditioning methods.

BACKGROUND OF THE INVENTION

Fuel cells are known in the art. The fuel cell is an electrochemical device which reacts hydrogen, and oxygen, which is usually supplied from the ambient air, to produce electricity and water. The basic process is highly efficient and fuel cells fueled directly by hydrogen are substantially pollution free. Further, since fuel cells can be assembled into stacks of various sizes, power systems have been developed to produce a wide range of electrical power output levels and thus can be employed in numerous applications.

Although the fundamental electrochemical processes involved in all fuel cells are well understood, engineering solutions have proved elusive for making certain fuel cell types reliable, and for others economical. In the case of polymer electrolyte membrane (PEM) fuel cell power systems, reliability has not been the driving concern to date, but the installed cost per watt of generation capacity has raised issues.

In order to further lower the PEM fuel cell cost per watt, much attention has been directed to increasing the power output of same. Historically, this has resulted in additional sophisticated balance-of-plant systems which are necessary to optimize and maintain high PEM fuel cell power output. A consequence of highly complex balance-of-plant systems is that they do not readily scale down to low capacity applications. Consequently, cost, efficiency, reliability and maintenance expenses are all adversely effected in low generation applications.

It is well known that single PEM fuel cells produce a useful voltage of only about 0.45 to about 0.7 Volts D.C. per cell under a load. Practical PEM fuel cell plants have been built from multiple cells stacked together such that they are electrically connected in series. It is further well known that PEM fuel cells can operate at higher power output levels when supplemental humidification is made available to the is proton exchange membrane (electrolyte).

In this regard, humidification lowers the resistance of proton exchange membranes to proton flow. To achieve this increased humidification, supplemental water can be introduced into the hydrogen or oxygen streams by various methods, or more directly to the proton exchange membrane by means of the physical phenomenon known as wicking, for example.

The focus of investigations, however, in recent years has been to develop membrane electrode assemblies (MEAs) with increasingly improved power output when running without supplemental humidification. Being able to run an MEA when it is self-humidified is advantageous because it decreases the complexity of the balance-of-plant with its associated costs. However, self-humidification heretofore has resulted in fuel cells running at lower current densities and thus, in turn, has resulted in more of these assemblies being required in order to generate a given amount of power.

While PEM fuel cells of various designs have operated with varying degrees of success, they have also had shortcomings which have detracted from their usefulness. For example, PEM fuel cell power systems typically have a number of individual fuel cells which are serially electrically connected (stacked) together so that the power system can have a increased output voltage. In this arrangement, if one of the fuel cells in the stack fails, it no longer contributes voltage and power.

One of the more common failures of such PEM fuel cell power systems is where a given MEA becomes less hydrated than other MEAs in the same fuel cell stack. This loss of membrane hydration increases the electrical resistance of the effected fuel cell, and thus results in more waste heat being generated. In turn, this additional heat drys out the membrane electrode assembly. This situation creates a negative hydration spiral. The continual overheating of the fuel cell can eventually cause the polarity of the effected fuel cell to reverse such that it now begins to dissipate electrical power from the rest of the fuel cells in the stack. If this condition is not rectified, excessive heat generated by the failing fuel cell may cause the MEA to perforate and thereby leak hydrogen. When this perforation occurs the fuel cell stack must be completely disassembled and repaired. Depending upon the design of fuel cell stack being employed, such repair or replacement may be a costly, and time consuming endeavor.

BRIEF DESCRIPTION OF THE DRAWINGS

Preferred embodiments of the invention are described below with reference to the following accompanying drawings.

FIG. 4 is a functional block diagram of an exemplary fuel cell cartridge.

FIG. 4a is a functional block diagram of an exemplary fuel cell power system depicting modular concepts in accordance with aspects of the present invention.

FIG. 5 is a functional block diagram illustrating plural fuel cell cartridges coupled in series with power conditioning circuitry.

FIG. 6 is a functional block diagram illustrating plural fuel cell cartridges coupled in parallel with power conditioning circuitry.

FIG. 7 is a characteristic voltage/current curve of the depicted fuel cell power system.

FIG. 10 is a schematic representation of a second configuration of power conditioning circuitry comprising DC-DC converter circuitry.

FIG. 11 is a schematic representation of another configuration of power conditioning circuitry comprising DC-DC converter circuitry.

FIG. 12 is a schematic representation of an exemplary configuration of power conditioning circuitry comprising inverter circuitry.

FIG. 14 is a schematic representation of an exemplary current sensing circuit.

FIG. 15 is a schematic representation of an exemplary voltage sensing circuit.

FIG. 16 is a schematic representation of another exemplary voltage sensing circuit.

DETAILED DESCRIPTION OF THE PREFERRED EMBODIMENTS

Figure 1:
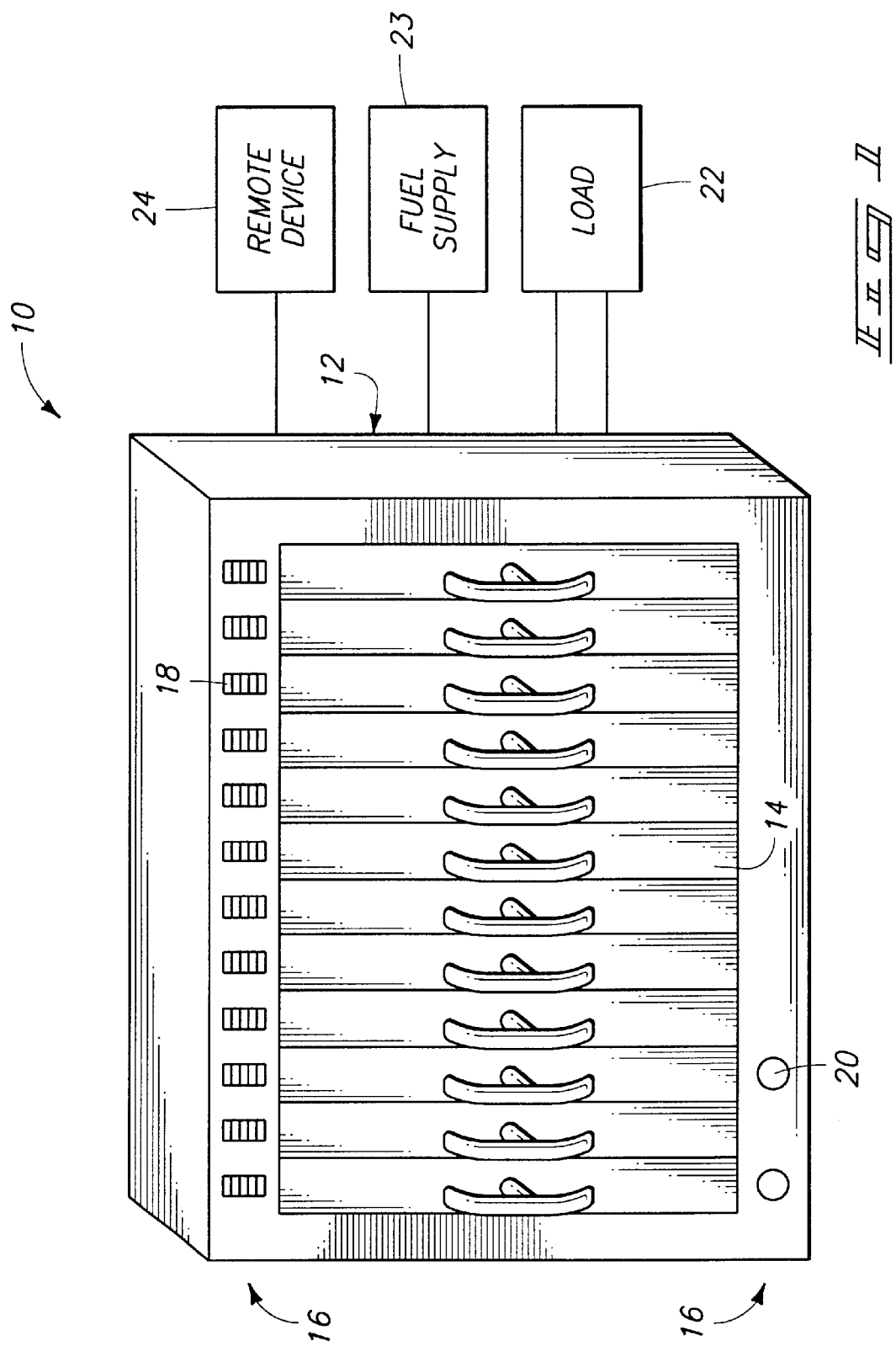
FIG. 1 is a perspective view of an exemplary fuel cell power system according to the present invention.

This disclosure of the invention is submitted in furtherance of the constitutional purposes of the U.S. Patent Laws "to promote the progress of science and useful arts" (Article 1, Section 8).

According to one aspect of the invention, a fuel cell power system comprises: a plurality of terminals adapted to couple with a load; a fuel cell configured to convert chemical energy into direct current electrical energy having a variable voltage potential; and a converter coupled intermediate the fuel cell and the terminals, the converter being configured to convert the direct current electrical energy having a variable voltage potential into direct current electrical energy having a substantially constant voltage potential.

A second aspect of the invention comprises a fuel cell power system including: a plurality of terminals adapted to couple with a load; a fuel cell configured to convert chemical energy into direct current electrical energy; and an inverter coupled intermediate the fuel cell and the terminals, the inverter being configured to convert the direct current electricity into alternating current electrical energy.

Another aspect of the invention provides a direct current voltage converter comprising: an input adapted to receive direct current electrical energy having a variable voltage potential; converter circuitry coupled with the input and configured to convert the direct current electrical energy having the variable voltage potential into direct current electrical energy having a substantially constant voltage potential; and an output coupled with the converter circuitry and configured to receive the direct current electrical energy having the substantially constant voltage.

Another aspect provides a fuel cell power system comprising: a housing; a plurality of output terminals; at least one cartridge configured for reception within the housing and comprising: a fuel cell configured to convert chemical energy into electrical energy; and power conditioning circuitry configured to electrically condition the electrical energy; and an electrical connection configured to couple the power conditioning circuitry with the output terminals.

According to another aspect of the invention, a fuel cell power system comprises: a fuel cell configured to convert chemical energy into electrical energy; and power, conditioning circuitry coupled with the fuel cell and configured to electrically condition the electrical energy; the power conditioning circuitry comprises a controller configured to monitor an operational parameter of the fuel cell power system and to control the conditioning of the electrical energy responsive to the monitoring.

Another aspect of the invention provides a fuel cell power system comprising: plurality of terminals adapted to couple with a load; a plurality of fuel cells configured to convert chemical energy into electrical energy and to provide the electrical energy to the terminals; and at least one power conditioning circuit electrically coupled with at least one of the fuel cells and configured to increase the voltage of the electrical energy from the at least one fuel cell.

Another aspect of the invention provides a fuel cell power system comprising: a power bus adapted to couple with a load; a plurality of fuel cells configured to convert chemical energy into electrical energy; and a plurality of power conditioning circuits electrically coupled intermediate the power bus and the fuel cells, the power conditioning circuits being configured to condition electrical energy from respective fuel cells.

Another aspect provides a fuel cell power system comprising: a plurality of terminals adapted to couple with a load; a plurality of fuel cells configured to convert chemical energy into electrical energy and to provide the electrical energy to the terminals; and a plurality of power conditioning circuits electrically coupled with respective fuel cells and configured to condition electrical energy from respective fuel cells.

Another aspect provides a fuel cell power system comprising: a plurality of terminals adapted to couple with a load; and a plurality of fuel cell cartridges individually comprising at least one fuel cell configured to convert chemical energy into electrical energy, the fuel cartridges being coupled in parallel with the terminals.

Another aspect of the invention provides a fuel cell power generation method comprising: providing a fuel cell; first converting chemical energy to direct current electrical energy having a variable voltage potential using the fuel cell; second converting the direct current electrical energy having a variable voltage potential to direct current electrical energy having a substantially constant voltage potential; and outputting the direct current electrical energy having the substantially constant voltage potential.

Another aspect provides a fuel cell power generation method comprising: providing a fuel cell having a plurality of terminals; first converting chemical energy to direct current electrical energy using the fuel cell; second converting the direct current electrical energy to alternating current electrical energy; and providing the alternating current electrical energy to the terminals.

According to another aspect, the invention provides a power conditioning method comprising: receiving direct current electrical energy having a variable voltage potential within a direct current converter; converting the direct current electrical energy having a variable voltage potential to direct current electrical energy having a substantially constant voltage potential using the direct current converter; and outputting the direct current electrical energy having the substantially constant voltage potential.

Another aspect of the invention includes a fuel cell power generation method comprising: providing a housing; coupling a cartridge comprising at least one fuel cell and power conditioning circuitry with the housing; converting chemical energy into electrical energy using the fuel cells of the cartridges; conditioning the electrical energy using the power conditioning circuitry; and supplying the electrical energy to a plurality of terminals.

Another aspect of the invention provides a fuel cell power generation method comprising: providing a housing; coupling a cartridge comprising at least one fuel cell and power conditioning circuitry with the housing; converting chemical energy into electrical energy using the fuel cells of the cartridges; conditioning the electrical energy using the power conditioning circuitry; and supplying the electrical energy to a plurality of terminals.

Yet another aspect of the invention provides a direct current power conditioning method comprising: receiving direct current electrical energy having a variable voltage potential; supplying direct current electrical energy at a substantially constant voltage potential to a plurality of terminals; monitoring: a voltage potential at the terminals; and charging an electrical energy storage device coupled with the terminals using the direct current electrical energy having the variable voltage potential responsive to the monitoring.

Another aspect provides a fuel cell power generation method comprising: providing a plurality of fuel cells; converting chemical energy to electrical energy using the fuel cells; increasing the voltage potential of the electrical energy from at least one of the fuel cells using at least one power conditioning circuit; and supplying the electrical energy to a plurality of terminals adapted to be coupled to a load after the increasing.

Another aspect provides a fuel cell power generation method comprising: providing a plurality of fuel cells; converting chemical energy to electrical energy using the fuel cells; conditioning the electrical energy using a plurality of power conditioning circuits corresponding to respective fuel cells; and supplying the electrical energy to a plurality of terminals adapted to be coupled to a load after the conditioning.

Yet another aspect provides a fuel cell power generation method comprising: providing a plurality of fuel cell cartridges individually including at least one fuel cell; converting chemical energy to electrical energy using the fuel cells; and supplying the electrical energy using the fuel cell cartridges coupled in parallel to a plurality of terminals adapted to be coupled to a load.

Referring to FIG. 1, one configuration of a fuel cell power system 10 is illustrated. The depicted configuration of fuel cell power system 10 is exemplary and other configurations are possible. As shown, fuel cell power system 10 includes a housing 12 provided about a plurality of fuel cell cartridges 14. Housing 12 defines a subrack assembly in the described embodiment.

Fuel cell power system 10 is configured to utilize one or more of fuel cell cartridges 14. Twelve such fuel cell cartridges 14 are utilized in the embodiment of fuel cell power 10 described herein. In the described embodiment, individual fuel cell cartridges 14 include a plurality of fuel cells. For example, individual fuel cell cartridges 14 include four fuel cells.

Such fuel cells can comprise polymer electrolyte membrane (PEM) fuel cells. In the described configuration, such fuel cells comprise membrane electrode assembly (MEA) fuel cells or membrane electrode diffusion assembly (MEDA) fuel cells. Further details of one configuration of fuel cells and fuel cell cartridges 14 are described in a co-pending U.S. patent application Ser. No. 08/979,853, entitled "A Proton Exchange Membrane Fuel Cell Power System", filed Nov. 20, 1997, naming William A. Fuglevand, Dr. Shiblihanna I. Bayyuk, Ph.D., Greg A. Lloyd, Peter D. Devries, David R. Lott, John P. Scartozzi, Gregory M. Somers and Ronald G. Stokes as inventors, assigned to the assignee hereof, and incorporated herein by reference.

Housing 12 additionally includes an operator interface 16. In the present embodiment, operator interface 16 includes a display 18 and interface switches 20. Operator interface 16 is configured to indicate operation of fuel cell power system 10 and also enable an operator to control various functions of fuel cell power system 10.

Display 18 of operator interface 16 is configured to emit a human perceptible signal, such as visible signals, to indicate operation of fuel cell power system 10. In the depicted embodiment, display 18 comprises a plurality of light emitting diode (LED) bar graph arrays to indicate operational conditions of respective fuel cell cartridges 14. In one configuration, individual bar graph arrays of display 18 indicate high and low voltages of fuel cells within the corresponding fuel cell cartridge 14.

Interface switches 20 permit a user to control operations of fuel cell power system 10. For example, one interface switch 20 can be provided to enable a user to turn on fuel cell power system 10. In addition, another interface switch 20 can include a load enable switch which permits a user to selectively apply power from fuel cell power system 10 to a load 22 coupled with the fuel cell power system 10. Another interface switch 20 can control a cartridge reset function described below.

Figure 2:
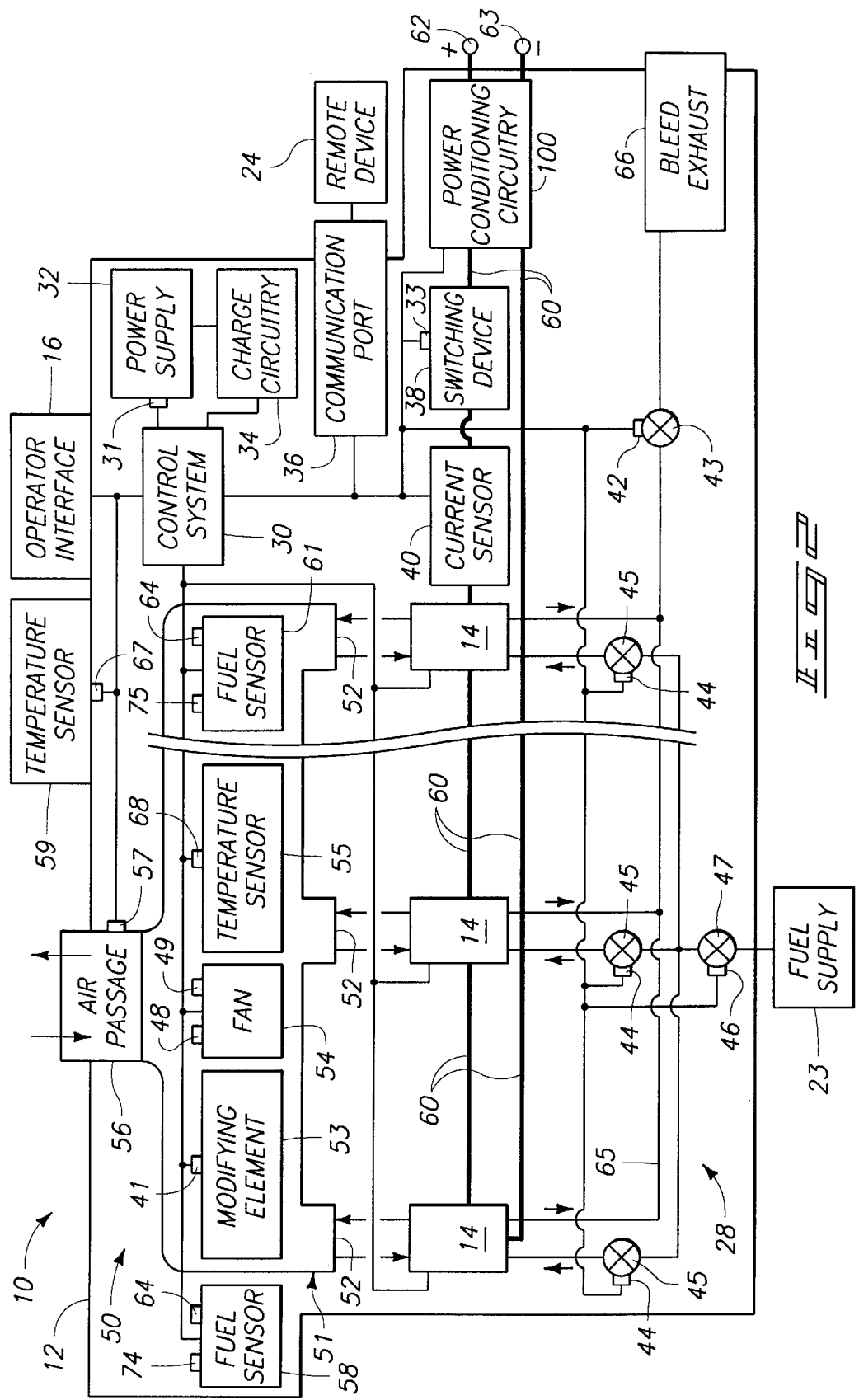
FIG. 2 is an illustrative representation of components of the fuel cell power system.

Referring to FIG. 2, some components of fuel cell power system 10 are shown. The components are internal and external of housing 12 of fuel cell power system 10. Internally, only three fuel cell cartridges 14 are shown for purposes of discussion herein. More fuel cell cartridges 14 are provided in typical configurations.

Fuel cell power system 10 is shown coupled with a remote device 24. Fuel cell power system 10 is preferably configured to communicate with remote device 24. An exemplary remote device 24 comprises an off-site control and monitoring station. Fuel cell power system 10 receives communications from remote device 24 which may comprise data and commands. Fuel cell power system 10 is also configured to output data, requests, etc. to remote device 24.

The depicted components include the plural fuel cell cartridges 14 and operator interface 16 discussed above. In addition, fuel cell power system 10 includes a control system 30. One configuration of control system 30 is described below in detail. The illustrated control system 30 is coupled with a power supply sensor 31 associated with a power supply 32, and charge circuitry 34. Control system 30 is additionally coupled with fuel cell cartridges 14 and operator interface 16. Further, control system 30 is coupled with a communication port 36, switching device 38 and current sensor 40. Control system 30 is additionally coupled with a bleed solenoid 42 associated with a bleed valve 43.

The depicted fuel cell power system 10 includes a fuel delivery system 28. Fuel delivery system 28 couples with a fuel supply 23 to 10 supply fuel to fuel cell cartridges 14. Exemplary fuel comprises 11 hydrogen gas in the described embodiment. Other fuels may be possible.

The depicted fuel delivery system 28 includes a main valve 47 and plural auxiliary valves 45 associated with respective fuel cell cartridges 14. Main valve 47 controls the flow of fuel from fuel supply 23 into fuel cell power system 10. Auxiliary valves 45 control the flow of fuel to respective fuel cell cartridges 14. Control system 30 is coupled with plural auxiliary solenoids 44 of associated auxiliary valves 45. Control system 30 is further coupled with a main solenoid 46 of associated main valve 47.

The depicted fuel cell power system 10 includes an air temperature control assembly 50. The illustrated air temperature control assembly 50 includes a plenum 51 having associated ports 52 corresponding to fuel cell cartridges 14. Within plenum 51 of air temperature control assembly 50, a temperature modifying element 53, fan 54, temperature sensor 55 and fuel sensor 61 are provided.

A controllable air flow device or air passage 56 couples plenum 51 to exterior ambient air outside of housing 12. Air passage 56 can permit the intake of air into plenum 51 as well as the exhaustion of air from plenum 51. Control system 30 is coupled with control circuitry 51 of modifying element 53, control circuitry 48 and monitoring circuitry 49 of fan 54, temperature circuitry 68 associated with temperature sensor 55, control circuitry 57 of air passage 56, and heater 75 of fuel sensor 61.

A first fuel sensor 58 is provided within housing 12 and outside of plenum 51 as shown. First fuel sensor 58 is operable to monitor for the presence of fuel within housing 12. A second fuel sensor 61 is provided within plenum 51 to monitor for the presence of fuel within plenum 51. Control system 30 is configured to couple with fuel detection circuitry 64 associated with fuel sensors 58, 61. Fuel detection circuitry 64 can condition measurements obtained from sensors 58, 61.

Heaters 74, 75 are coupled with respective fuel sensors 58, 61 to provide selective heating of fuel sensors 58, 61 responsive to control from control system 30. Heaters 74, 75 are integral of fuel sensors 58, 61 in some configurations. An exemplary fuel sensor configuration with an integral heater has designation TGS 813 available from Figaro Engineering, Inc. Such heaters are preferably provided in a predefined temperature range to assure proper operation. Other configurations of sensors 58, 61 are possible.

An external temperature sensor 59 is provided outside of housing 12 in one embodiment. Control system 30 is also coupled with temperature circuitry 67 associated with temperature sensor 59 to monitor the exterior temperature. Temperature circuitry 67 conditions signals received from temperature sensor 59.

Control system 30 is configured to at least one of control and monitor at least one operation of fuel cell power system 10. During operation, fuel from fuel supply 23 is applied to main valve 47. Main valve 47 is coupled with auxiliary valves 45 as shown. Responsive to control from control system 30, main valve 47 and auxiliary valves 45 apply fuel to, respective fuel cell cartridges 14. Responsive to the supply of fuel, and in the presence of oxygen, fuel cell cartridges 14 produce electrical power.

A power bus 60 couples the fuel cell cartridges 14 in series. Power bus 60 provides an electrical connection which is coupled with external terminals 62, 63 which may be connected with an external load 22 (shown in FIG. 1). Terminal 62 provides a positive terminal and terminal 63 provides a negative terminal of fuel cell power system 10.

Air temperature control assembly 50 applies oxygen to the respective fuel cell cartridges 14 via ports 52. Fuel cell cartridges 14 are individually operable to convert chemical energy into electricity. As described below, fuel cartridges 14 individually contain plural fuel cells individually having an anode side and a cathode side. Auxiliary valves 45 apply fuel to the anode sides of the fuel cells. Plenum 51 directs air within the cathode sides of the fuel cells.

Air temperature control assembly 50 preferably provides circulated air within a predetermined temperature range. Such circulated air can be exterior air and/or recirculated air. In the preferred embodiment, air temperature control assembly 50 provides air within plenum 51 within an approximate temperature range of 25° Celsius to 80° Celsius.

Upon start-up conditions of fuel cell power system 10, modifying element 53 may be controlled via control system 30 using element control circuitry 41 to either. increase. or decrease the temperature of air present, within plenum 51. Fan 54 operates to circulate the air within plenum 51 to respective fuel cell cartridges 14. Fan control circuitry 48 and fan monitor circuitry 49 are shown coupled with fan 54.

Responsive to control from control system 30, fan control circuitry 48 operates to control air flow rates (e.g., speed of rotation) of fan 54. Fan monitor circuitry 49 operates to monitor the actual air flow rates induced by fan 54 (e.g., circuitry 49 can comprise a tachometer for rotational fan configurations).

Control system 30 monitors the temperature of the air within plenum 51 using temperature sensor 55. During operation, heat is generated and emitted from fuel cell cartridges 14. Thus, it may be necessary to decrease the temperature of air within plenum 51 to provide efficient operation of fuel cell power system 10. Responsive to control from control system 30, air passage 56 can be utilized to introduce exterior air into plenum 51 and exhaust air from plenum 51 to ambient.

Control system 30 communicates with control circuitry 57 to control air passage 56. In one embodiment, air passage 56 includes a plurality of vanes and control circuitry 57 operates to control the position of the vanes of air passage 56 to selectively introduce exterior air into plenum 51. The vanes of air passage 56 can preferably be provided in a plurality. of orientations between an open position and a closed position to vary the amount of exterior fresh air introduced into plenum 51 or the amount of air exhausted from plenum 51 responsive to control from control system 30. Air circulated within plenum 51 can comprise recirculated and/or fresh ambient air.

Utilizing temperature sensor 59, control system 30 can also monitor the temperature of ambient air about housing 12. Control system 30 can utilize such exterior temperature information from temperature sensor 59 to control the operation of air passage 56. Temperature sensor 59 is located adjacent air passage 56 in a preferred embodiment.

As described in further detail below, control system 30 controls air flow rates of fan 54 using fan control circuitry 48. Fan monitor circuitry 49 provides air flow rate information to control system 30. Control system 30 can monitor the total system voltage being delivered via power bus 60 by summing the individual cell voltages. Control system 30 can also monitor the electrical load being delivered via power bus 60 using current sensor 40. With knowledge of the system bus voltage and load, control system 30 can calculate waste thermal power and provide a desired cooling air flow.

More specifically, the efficiency of one or more fuel cells may be determined by dividing the respective fuel cell voltage by 1.23 (a theoretical maximum voltage of a single fuel cell). An average efficiency can be determined for fuel cells 90 of fuel cell power system 10. The remaining energy (energy not associated to electricity) as determined from the efficiency calculation is waste thermal power. The determined waste thermal power may be utilized to provide a desired cooling air flow. Control system 30 controls the air flow rates of fan 54 depending upon the waste thermal power in accordance with one aspect of the described fuel cell power system 10.

During operation of fuel cell cartridges 14, non-fuel diluents such as cathode-side water and atmospheric constituents can diffuse from the cathode side of the fuel cell through a membrane electrode assembly of the fuel cell and accumulate in the anode side of the fuel cell. In addition, impurities in the fuel supply delivered directly to the anode side of the fuel cell also accumulate. Without intervention, these diluents can dilute the fuel sufficiently enough to degrade performance. Accordingly, the anode side of the individual fuel cells is connected to a bleed manifold 65. Bleed manifold 65 is additionally coupled with bleed valve 43.

Control system 30 selectively operates bleed solenoid 42 to selectively open and close bleed valve 43 permitting exhaustion of matter such as entrained diluents and perhaps some fuel via a bleed exhaust 66 within housing 12. Control system 30 can operate to open and close bleed valve 43 on a periodic basis. The frequency of openings and closings of bleed valve 43 can be determined by a number of factors, such as electrical load coupled with terminals 62, 63, etc. Although not shown, a fuel recovery system may be coupled with bleed exhaust 66 to retrieve unused fuel for recirculation or other uses.

Following a start-up condition, either, inputted via interface or from remote device 24, control system 30, selectively controls switching device 38 to couple power bus 60 with positive terminal 62. Switching device 38 can comprise parallel MOSFET switches to selectively couple power bus 60 with an external load 22.

For example, control system 30 may verify when an appropriate operational temperature within plenum 51 has been reached utilizing temperature sensor 55. In addition, control system 30 can verify that at least one electrical characteristic, such as voltage and/or current, of respective fuel cell cartridges 14 has been reached before closing switching device 38 to couple power bus 60 with an associated load 22. Such provides proper operation of fuel cell power system 10 before coupling bus 60 with an external load 22.

Power supply 32 includes power supplies having different voltage potentials in the described embodiment. For example, power supply 32 can provide a 5 Volt supply voltage for operating the digital circuitry of fuel cell power system 10, such as control system 30. Power supply 32 can also provide higher voltage potentials, such as +/- 12 Volts for operation of components such as fan 54 within fuel cell power system 10.

Further, power supply 32 can include a battery powering components during start-up procedures. Following start-up procedures, power supply 32 can be coupled with power bus 60 and internal power utilized by fuel cell power system 10 can be derived from electrical power generated from: fuel cell cartridges 14. Charge circuitry 34 is provided to selectively: charge batteries of power supply 32 utilizing power from power bus 60. Control system 30 is configured to monitor electrical conditions of the batteries and the supplied voltages of power supply 32 using power supply sensors 31. Control system 30 can operate charge circuitry 34 to charge batteries of power supply 32 depending upon such monitoring operations.

Control system 30 is also coupled with communication port 36 providing communications to an external device such as a remote device 24. An exemplary remote device 24 comprises an external control system or monitoring system off-site from fuel cell power system 10. Control system 30 can output data including requests, commands, operational conditions, etc., of fuel cell power system 10 using communication port 36. In addition, control system 30 can receive data including commands, requests, etc., from remote device 24 using communication port 36. Additional details of control system 30 are described in U.S. patent application Ser. No. 09/322,666, filed May 28, 1999, entitled Fuel Cell Power Systems and Methods of Controlling a Fuel Cell Power System, naming William A. Fuglevand, P. E., Dr. Shiblihanna I. Bayyuk, Ph.D., Greg A. Lloyd, Peter D. Devries, David R. Lott, and John P. Scartozzi as inventors, assigned to the assignee hereof, and incorporated herein by reference.

Power conditioning circuitry 100 is illustrated coupled with bus 60 in the configuration depicted in FIG. 2. Power conditioning circuitry 100 is configured to receive and condition direct current electrical energy received from fuel cells within cartridges 14. Such conditioning of the electrical energy is described in detail below. Power conditioning circuitry 100 is provided within respective cartridges 14 to condition the electrical energy applied to bus 60 in some configurations (e.g., cartridge 14 in FIG. 3 and FIG. 4). Alternatively, power conditioning circuitry 100 is implemented externally of fuel cell cartridges 14.

Figure 3:
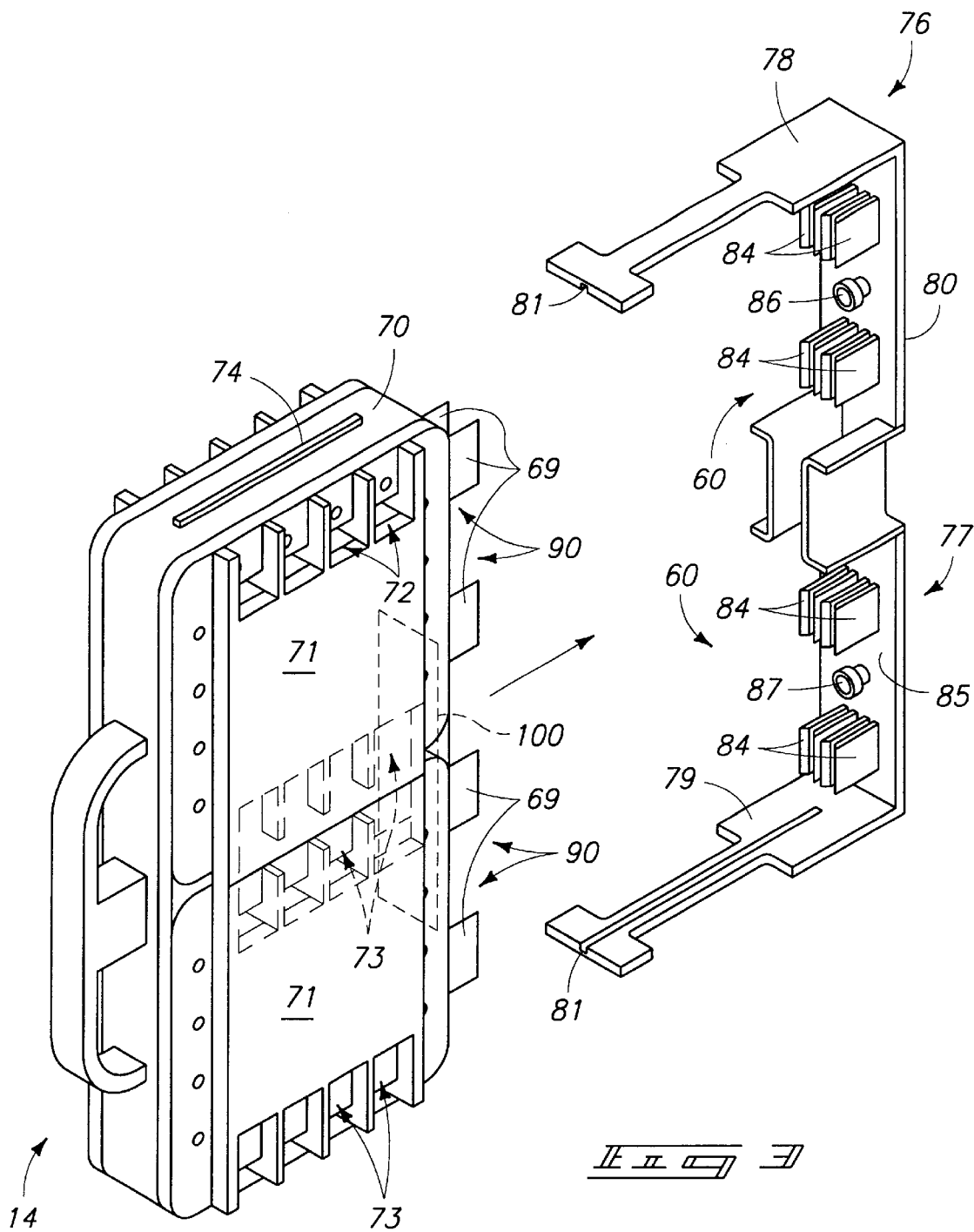
FIG. 3 is an exploded perspective view of an exemplary configuration of a fuel cell cartridge assembly of the fuel cell power system.

Referring to FIG. 3, an exemplary fuel cell cartridge 14 is shown. The depicted fuel cell cartridge 14 includes a fuel distribution frame 70 and a force application assembly which includes plural cathode covers 71 which partially occlude respective cavities housing membrane electrode assemblies (MEA) or membrane electrode diffusion assemblies (MEDA) within fuel distribution frame 70. The depicted fuel cell cartridge 14 includes four fuel cells 90. Other configurations are possible. Additional details of individual fuel cells 90 and cartridges 14 are disclosed in U.S. patent application Ser. No. 08/979,853 incorporated by reference above.

The respective cathode covers 71 individually cooperate or otherwise mate with each other, and with the fuel distribution frame 70. Individual apertures 72 which are defined by the cathode cover, define passageways 73 which permit air from plenum 51 to circulate to. the cathode side of the membrane electrode diffusion assembly contained so within fuel distribution frame 70. The circulation of air through the fuel cell cartridge 14 is discussed in significant detail in U.S. patent application Ser. No. 08/979,853 incorporated by reference above.

Conductive members 63 extend outwardly from a main body of individual fuel cells within fuel cell cartridge 14. Conductive members 63 are designed to extend through respective gaps or openings which are provided in fuel distribution frame 70. Each conductive member 63 is received between and thereafter electrically coupled with pairs of conductive contacts which are mounted on a rear wall of a subrack described in greater detail below.

Fuel cell cartridge 14 is operable to be coupled in series or parallel with a plurality of other fuel cell cartridges 14 by way of a subrack which is generally indicated by the numeral 76. Subrack 76 has a main body 77 having top and bottom portions 78, 79, respectively. The top and bottom portions are joined together by a rear wall 80. Elongated channels 81 are individually formed in top and bottom portions 78, 79 and are operable to slidably receive individual spines 74 which are formed on fuel distribution frame 70.

Subrack 76 is made of a number of mirror image portions 85, which when joined together, form the main body 77 of subrack 76. These mirror image portions 85 are fabricated from a moldable dielectric substrate. Power bus 60 is affixed on rear wall 80 of the subrack 90. A repeating pattern of eight pairs of conductive contacts 84 are attached on rear wall 80 and are coupled with power bus 60. Electrical coupling of fuel cells within fuel cell cartridge 14 with power bus 60 is implemented using contacts 84 in the described embodiment.

First and second conduits 86, 87 are also attached to rear wall 80 14, and are operable to matingly couple in fluid flowing relation to the fuel distribution frame 70. The respective first and second conduits 86, 87 extend through rear wall 80 and connect with suitable external conduits (not shown). First conduit 86 is coupled in fluid flowing relation with fuel supply 23 (FIG. 1) and with anode sides of internal fuel cells. Further, second conduit 87 exhausts from the anode sides of the fuel cells to bleed manifold 65 (FIG. 2).

Individual fuel cell cartridges 14 may be selectively deactivated. For example, fuel cell cartridges 14 are individually physically removable from fuel cell power system 10. Removal of one or more fuel cell cartridges 14 may be desired for maintenance, replacement, etc. of the fuel cell cartridges 14. The remaining fuel cell cartridges 14 and internal fuel cells thereof may continue, if desired, to supply power to an associated load 22 with one or more of the fuel cell cartridges 14 deactivated (e.g., removed).

Individual contacts 84 may be configured to maintain electrical continuity of bus 60 upon physical removal of a fuel cell cartridge 14 from an associated subrack 76. As shown, individual contacts 84 comprise make before break contacts which individually include plural conductive members configured to receive an associated contact 69 of a fuel cell cartridge 14. Individual contacts 69 can comprise a tang or knife. Upon physical removal of fuel cell cartridge 14 and the corresponding terminals 69, conductive members of contacts 84 are mechanically coupled together to maintain a closed circuit within bus 60 intermediate terminals 62, 63. Such maintains a supply of electrical power to load 22 coupled with terminals 62, 63 during removal of one or more fuel cell cartridges 14 from fuel cell power system 10.

Referring to FIG. 4, an exemplary fuel cell cartridge 14 comprises one or more fuel cells 90 coupled with power conditioning circuitry 100. Four fuel cells 90 are depicted in the illustrated embodiment. Fuel cells 90 may be coupled in either series or parallel with power conditioning circuitry 100. Power conditioning circuitry 100 is coupled with contacts 69 to provide electrical coupling of fuel cells 90 with bus 60. Exemplary power conditioning circuitry 100 comprises a controller and memory described below. Other configurations are possible.

The depicted fuel cell cartridge 14 includes internal power conditioning circuitry 100 according to one aspect of the invention as shown in FIG. 4. Alternatively, the power conditioning circuitry 100 is provided external of fuel cell cartridges 14 inside or outside of housing 12 of the fuel cell power system 10. Power conditioning circuitry 100 external of fuel cell cartridges 14 is shown in FIG. 2, for example. Some configurations provide power conditioning circuitry 100 both within individual fuel cell cartridges 14 and external of fuel cell cartridges 14 and coupled with terminals 62, 63.

External power conditioning circuitry 100 provided within housing 12 conditions electrical energy within bus 60 coupled with terminals 62, 63. Internal power conditioning circuitry 100 within fuel cell cartridges 14 provides conditioning of electrical energy supplied by respective fuel cell cartridges 14 to bus 60. The particular configuration of fuel cell power system 10 depends upon the particular application and design choice of a user, designer, etc.

Referring to FIG. 4a, one exemplary power system implementation is illustrated. The fuel cell power system comprises a plurality of cartridges 14 which individually include one or more fuel cell (not shown in FIG. 4a), plural power conditioning circuits 100, and power bus 60. As shown, power conditioning circuits 100 are depicted intermediate power bus 60 and respective fuel cell cartridges 14 (including the fuel cells). The illustrated power conditioning circuits 100 correspond to respective fuel cell cartridges 14 in the depicted embodiment.

Power conditioning circuits 100 are configured to condition electrical energy from respective fuel cell cartridges 14. For example, power conditioning circuits 100 are configured to increase the voltage potential, decrease the voltage potential, or provide a predetermined substantially output voltage potential.

The couplings of power conditioning circuits 100 and power bus 60 are arranged in one configuration to provide power conditioning circuits 100 in parallel with terminals 62, 63. Such provides fuel cell cartridges 14 in parallel with terminals 62, 63. Alternatively, the couplings of power conditioning circuits 100 and power bus 60 provide fuel cell cartridges 14 in series with terminals 62, 63.

Referring to FIG. 5, an exemplary arrangement of fuel cell power system 10 corresponding to the configuration of FIG. 2 is shown. In particular, the depicted fuel cell cartridges 14 are illustrated coupled in series via bus 60. Bus 60 is additionally coupled with power conditioning circuitry 100 external of fuel cell cartridges 14. More specifically, power conditioning circuitry 100 is provided intermediate fuel cell cartridges 14 and terminals 62, 63 in the depicted configuration.

The illustrated embodiment of power conditioning circuitry 100 includes an internal controller 102 coupled with memory 103. A suitable controller 102 is available as a microprocessor having product designation 68HC912B32 from Motorola, Inc. Such a controller 102 is configured to provide pulse width modulation (PWM) of control signals according to certain aspects of the present invention. Other control configurations are utilized in other embodiments of the invention.

As described in detail below, controller 102 is configured according to some aspects of the present invention to monitor operational parameters of fuel cell power system 10 and to control power conditioning circuity 100 responsive to such monitoring. For example, controller 102 is coupled with individual respective fuel cell cartridges 14 and is configured to monitor at least one operational parameter thereof. Controller 102 controls power conditioning circuitry 100 responsive to such monitoring in the, described embodiment.

Controller 102 is configured to monitor voltages and currents within fuel cell cartridges 14 according to certain aspects of the present invention. According to other aspects of the invention, controller 102 is configured to monitor other operational parameters of fuel cell power system 10, such as temperature within housing 12 or temperature within individual fuel cell cartridges 14 using temperature sensors (see, e.g., sensor 55 in FIG. 2). Other operational parameters may be monitored.

Memory 103 is configured to store executable code for use within controller 102. Controller 102 utilizes memory 103 to store a history of operations of fuel cell power system 10 or other desired data. For example, memory 103 comprises both read only memory (ROM) and random access memory (RAM) in the described embodiment.

Controller 102 is coupled to provide communications with control system 30 in the described embodiment. Alternatively, controller 102 is implemented within control system 30 and control system 30 is configured to control power conditioning operations in accordance with another embodiment. Other power conditioning control arrangements are provided in other embodiments.

Referring to FIG. 6, another configuration of the fuel cell power system is depicted as reference 10a. In the illustrated fuel cell power system 10a, fuel cell cartridges 14 are coupled in parallel with terminals 62, 63 using bus 60. Power conditioning circuitry 100 is intermediate bus 60 and terminals 62, 63 in the illustrated arrangement. The utilization of fuel cell power system 10 or 10a depends upon the particular application or use of the power system and the design choice of a user, designer, etc. Typically, fuel cell power system 10 of FIG. 5 is utilized for increased current applications while fuel cell power system 10a is utilized for increased voltage applications.

Referring to FIG. 7, a characteristic curve of an exemplary fuel cell power system is illustrated. The depicted graphical representation illustrates voltage output of fuel cell power system 10 (i.e., serially arranged fuel cell cartridges 14) in relation to the output current within bus 60. The magnitude of the current corresponds or depends upon the usage of load 22.

For example, for fuel cell power system 10 comprising twelve fuel cell cartridges 14 individually including four fuel cells 90, the maximum voltage is approximately 44 Volts. As current increases within bus 60 to load 22, the voltage of fuel cell power system 10 drops, as illustrated in the graphical representation of FIG. 7. A maximum current output of the depicted fuel cell power system 10 arrangement is approximately 85 Amps.

In numerous applications, it is desired to provide a substantially constant voltage potential at the output of individual fuel cell cartridges 14 and/or fuel cell power system 10 at terminals 62, 63. In accordance with certain aspects of the present invention, power conditioning circuitry 100 is configured to receive direct current electrical energy having a variable voltage potential (e.g., unconditioned from one or more fuel cell 90), and provide electrical energy having a substantially constant voltage potential. As described below, power conditioning circuitry 100 is configured for other operations according to other aspects of the present invention. For example, power conditioning circuitry 100 is configured to provide inverter functionality alone or in addition to the direct current voltage conversion operations.

Referring to FIGS. 8–13, exemplary configurations of power conditioning circuitry 100 and control methodologies thereof are described. The depicted configurations of power conditioning circuitry 100 are exemplary and other arrangements are provided in other embodiments of the present invention.

Figure 8:
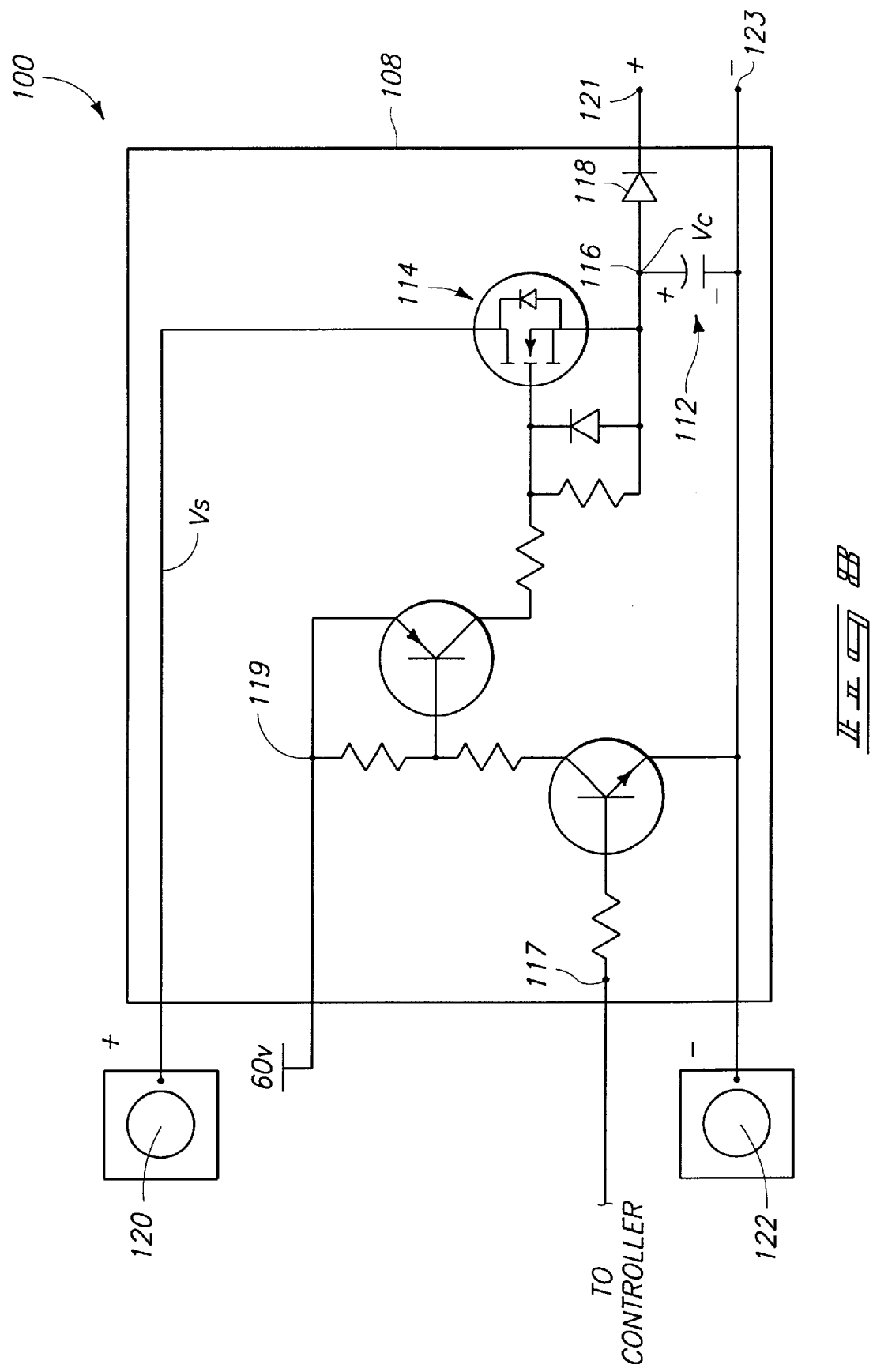
FIG. 8 is a schematic representation of an exemplary configuration of power conditioning circuitry comprising DC-DC converter circuitry.

Referring specifically to FIG. 8, the depicted power conditioning circuitry 100 is implemented as a DC-DC step-down converter or voltage pre-regulator. The depicted DC-DC converter power conditioning circuitry 100 includes an input comprising input terminals 120, 122, converter circuitry 108 and output terminals 121, 123. Input terminals 120, 122 are configured to couple with fuel cell cartridges 14 using bus 60. Terminal 120 comprises a positive DC terminal and terminal 122 comprises a ground terminal.

Converter circuitry 108 in configured to couple intermediate fuel cell cartridges 14 and output terminals 121, 123. Output terminals 121, 123 comprise terminals 62, 63 of fuel cell power system 10 in some embodiments. Converter circuitry 108 is configured to convert received direct current electrical energy having a variable voltage potential into direct current electrical energy having a substantially constant voltage potential at an output comprising terminals 121, 123.

As shown, the depicted arrangement of converter circuitry 108 comprises an electrical storage device 112 and a switch 114. Electrical energy storage device 112 comprises a capacitor and switch 114 comprises a metal oxide semiconductor field effect transistor (MOSFET).

Switch 114 is configured to selectively couple one or more fuel cells 90 with electrical energy storage device 112.

In the described embodiment, controller 102 is configured to monitor at least one operational parameter of fuel cell power system 10 and to control switch 114 responsive to the monitoring. For example, controller 102 is configured to monitor a voltage potential of electrical energy storage device 112 at a node 116. Responsive to the monitoring, controller 102 operates switch 114 to selectively couple terminal 120 with node 116 to charge electrical energy storage device 112.

In an exemplary application, it is desired to provide a substantially constant direct current voltage potential of 26 Volts at output terminals 121, 123. Accordingly, it is desired to provide a direct current voltage potential of approximately 27 Volts across electrical energy storage device 112 to account for the voltage drop across a diode 118.

According to one operational methodology, if controller 102 senses the voltage potential: at node 116 dropping below 27 Volts, controller 102 turns; switch, 114 on to charge electrical energy storage device 112 using power received from fuel cells 90 via terminal 120. More specifically, controller 102 is configured to control switch 114 to maintain a direct current voltage potential across electrical energy storage device 112 above a predetermined threshold. Accordingly, converter circuitry 108 operates to provide a substantially constant direct current voltage potential across output terminals 121, 123.

A charge pump (not shown) is coupled with converter circuitry 108 to provide the 60 Volt supply. It is desired to provide the voltage potential at node 119 approximately 20 Volts higher than the highest possible voltage from fuel cell cartridges 14 at terminal 120. Controller 102 provides control signals to node 117 to control the operation of switch 114 in the depicted embodiment.

Figure 9:
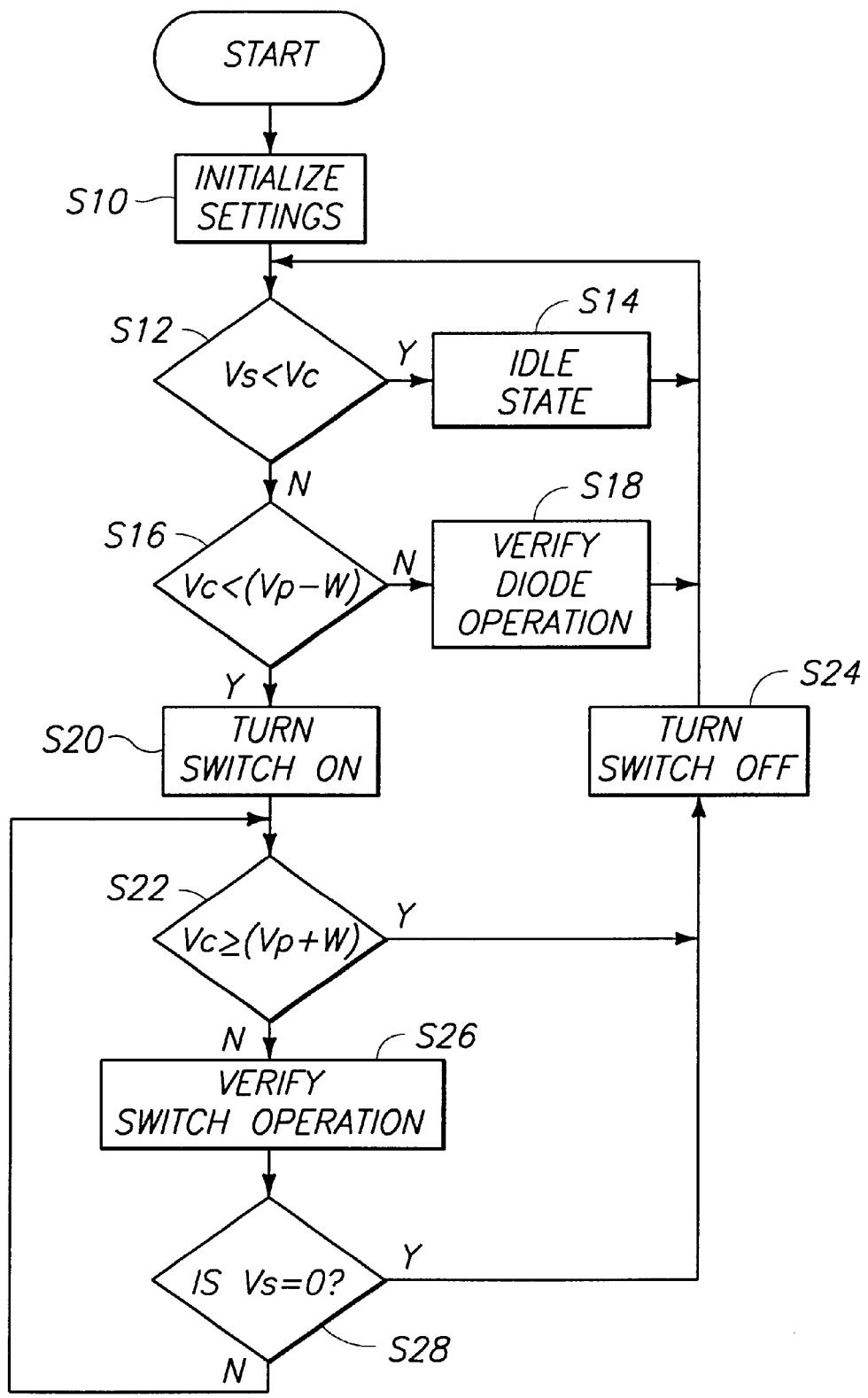
FIG. 9 is a flow chart illustrating exemplary control operations of the power conditioning circuitry of FIG. 8.

Referring to FIG. 9, an exemplary method for controlling DC-DC converter circuitry 108 is illustrated. The depicted methodology is stored as executable code for use by controller 102 in the described embodiment. Such code is stored within internal memory of controller 102 or within memory 103 accessible by controller 102. The method of FIG. 9 maintains the output voltage of the power conditioning circuitry 100 above a threshold voltage. Other control methods are used in other embodiments.

Initially, controller 102 proceeds to step S10 to initialize settings. For example, a desired. output voltage potential is set along with an acceptable amount: of deviation. The set point voltage is the desired voltage at node 116 and is referred to as $V_P$. Acceptable deviation from the desired set point voltage is a window parameter referred to as W.

At step S12, controller 102 determines whether the voltage at terminal 120 (referred to as voltage $V_S$) is less than the actual measured voltage at node 116 (referred to as voltage $V_C$). Exemplary voltage monitoring circuitry is depicted in FIG. 15 which may be coupled with controller 102.

Controller 102 proceeds to step S14 if the voltage at terminal 120 is less than the voltage at node 116. At step S14, controller 102 is provided within an idle state corresponding to fuel cell power system 10 being off. Thereafter, controller 102 proceeds to step S12 and continues to compare voltage potentials at terminal 120 and node 116.

If the voltage at terminal 120 is greater than the voltage at node 116, controller 102 proceeds to step S16. At step S16, controller 102 determines whether the voltage $V_C$ at node 116 is less than the desired set point voltage $V_P$ minus the window variation parameter W.

Controller 102 proceeds to step S18 responsive to the condition at step S16 being negative. At step S18, controller 102 is configured to monitor diode operation to ensure proper application of power to any load coupled with output terminals 121, 123. Thereafter, controller 102 returns to step S12.

If step S16 is in the affirmative, controller 102 proceeds to step S20 to turn on switch 114. Electrical energy storage device 112 is charged responsive to switch 114 being provided in the on condition at step S20.

Controller 102 proceeds to step S22 to determine whether the voltage $V_C$ at node 116 is greater than the set point voltage $V_P$ plus any variation W.

If the condition at step S22 is in the affirmative, controller 102 proceeds to step S24 to turn off switch 114. Controller 102 then returns to step S12.

Responsive to the condition at step S22 being in the negative, controller 102 proceeds to step S26 to verify the operation of switch 114. In particular, controller 102 determines whether the voltage $V_S$ at terminal 120 is substantially equal to the voltage $V_C$ at node 116. An alarm or other condition may be issued responsive to switch 114 being faulty.

Thereafter, controller 102 proceeds to step S28. Controller 102 determines whether the voltage $V_S$ at terminal 120 is equal to zero at step S28. If so, controller 102 proceeds to step S24 to turn off witch 114.

If the condition at step S28 is in the negative, controller 102 proceeds to step S22 to again compare the voltage $V_C$ at node 116 with the set point voltage $V_P$ and any acceptable variation W.

Referring to FIG. 10–12, other exemplary configurations of power conditioning circuitry are respectively illustrated as references 100a–100c. The depicted configuration of power conditioning circuitry 100a comprises a buck or step-down DC-DC converter. The depicted configuration of power conditioning circuitry 100b comprises a boost or step-up DC-DC converter. The depicted configuration of power conditioning circuitry 100c comprises an inverter. Power conditioning circuits 100a–100c individually include input terminals 120, 122 and output terminals 121, 123.

As previously described, power conditioning circuits 100a–100c are individually implemented in some configurations within fuel cell cartridges 14 to provide power conditioning on a modular (i.e., fuel cell cartridge 14) basis. In such configurations, input terminals 120, 122 are coupled with fuel cells 90 and output terminals 121, 123 are coupled with bus 60.

According to other aspects of the present invention, power conditioning circuits 100a–100c provide system power conditioning. In such arrangements, input terminals 120, 122 of power conditioning circuits 100a–100c are coupled with bus 60 and output terminals 121, 123 are coupled with or comprise terminals 62, 63 of fuel cell power system 10.

In some configurations, both DC-DC converter circuitry and inverter circuitry are utilized within a single power conditioning circuitry configuration. Accordingly, one or more of the depicted power conditioning circuits 100, 100a, 100b, 100c may be utilized in a given fuel cell cartridge 14 or fuel cell power system 10. For example, power conditioning circuitry 100, 100a, 100b comprising DC-DC converters may be initially utilized to convert a DC voltage potential from fuel cells 90 to another DC voltage potential. Thereafter, power conditioning circuitry 100c may be implemented or utilized to convert the DC converted electrical energy into alternating current electrical energy. Other arrangements are provided in other aspects of the invention.

Power conditioning circuits 100a–100c depicted in FIGS. 10–12 utilize switch mode power conditioning techniques. Switching devices are utilized to divert energy within the circuitry to at least one energy storage device (e.g., an inductor, transformer, capacitor). The switches typically comprise electronically controlled switches.

Controller 102 is configured to control the operation of switches 124 using gate control signals. As described further below, control over the illustrated power conditioning circuits 100a–100c is accomplished by pulse-width modulation (PWM) utilizing controller 102 in the described embodiment. The switching devices are switched on at a fixed interval or frequency while the time that the switch is left on varies (i.e., the duty cycle is varied). In the described configuration, controller 102 provides the pulse-width modulation switching control signals. As also detailed below, controller 102 monitors operational parameters of fuel cell power. system 10, such as voltages, currents and temperatures ;to determine: an appropriate pulse-width modulation duty cycle. Controller 102 is configured to vary the duty cycle of the control signals to provide a desired operation.

Referring specifically to FIG. 10, power conditioning circuitry 100a includes plural switches 124 and an electrical energy storage device 128 comprising an inductor. Switches 124 are coupled with controller 102. Exemplary configurations of switches 124 include implementation as a MOSFET, insulated gate bipolar transistor (IGBT), bipolar junction transistor (BJT), thyristor, metal oxide semiconductor controlled thyristor (MCT), or gate-turn-off thyristor (GTO), for example.

In general, power conditioning circuitry 100a implemented as a step-down converter provides an output voltage at terminals 121, 123 which is less than an input voltage received via terminals 120, 122. Power conditioning circuitry 100a provides an output current which is greater than a received input current.

Referring to FIG. 11, power conditioning circuitry 100a includes switch 124 and an inductor as an energy storage device 128. Switch 124 is coupled with controller 102. In general, power conditioning circuitry 100b implemented as a step-up converter provides an output voltage at terminals 121, 123 which is greater than an input voltage received via terminals 120, 122. Power conditioning circuitry 100b provides an output current which is less than a received a input current.

Referring to. FIG., 12, power conditioning circuitry configured as an inverter is depicted as reference 100c. The depicted inverter power conditioning circuitry 100c is configured to convert input DC voltage and current to AC voltage and current. Typically, the amplitude and frequency of the alternating voltage waveform are regulated while the load generally affects the current waveform. The voltage waveform oscillates at 50 to 60 Hz in the described embodiment.

As described previously, output terminals 121, 123 may be coupled directly to a utility power grid or, alternatively, to bus 60 of the fuel cell power system 10. In the case of coupling inverter power conditioning circuitry 100c with a utility power grid, the voltage waveform is typically synchronized to the grid before such connection is made. Such synchronization may be accomplished using appropriate digital and/or analog circuitry.

The disclosed configuration of inverter power conditioning circuitry 100c includes switches 124, inductor 128 and transformer 130. Controller 102 operates to control switches 124 using pulse-width modulated control signals in the described embodiment to generate alternating current power at output terminals 121, 123 coupled with transformer 130.

In other configurations, power conditioning circuitry 100 comprises non-isolated converter topologies for DC-DC conversion functions, such as buck-boost, cuk and full-bridge, for example. A variety of isolated DC-DC converter schemes are also possible, such as fly-back, forward, push-pull, half and full-bridge.

Figure 13:
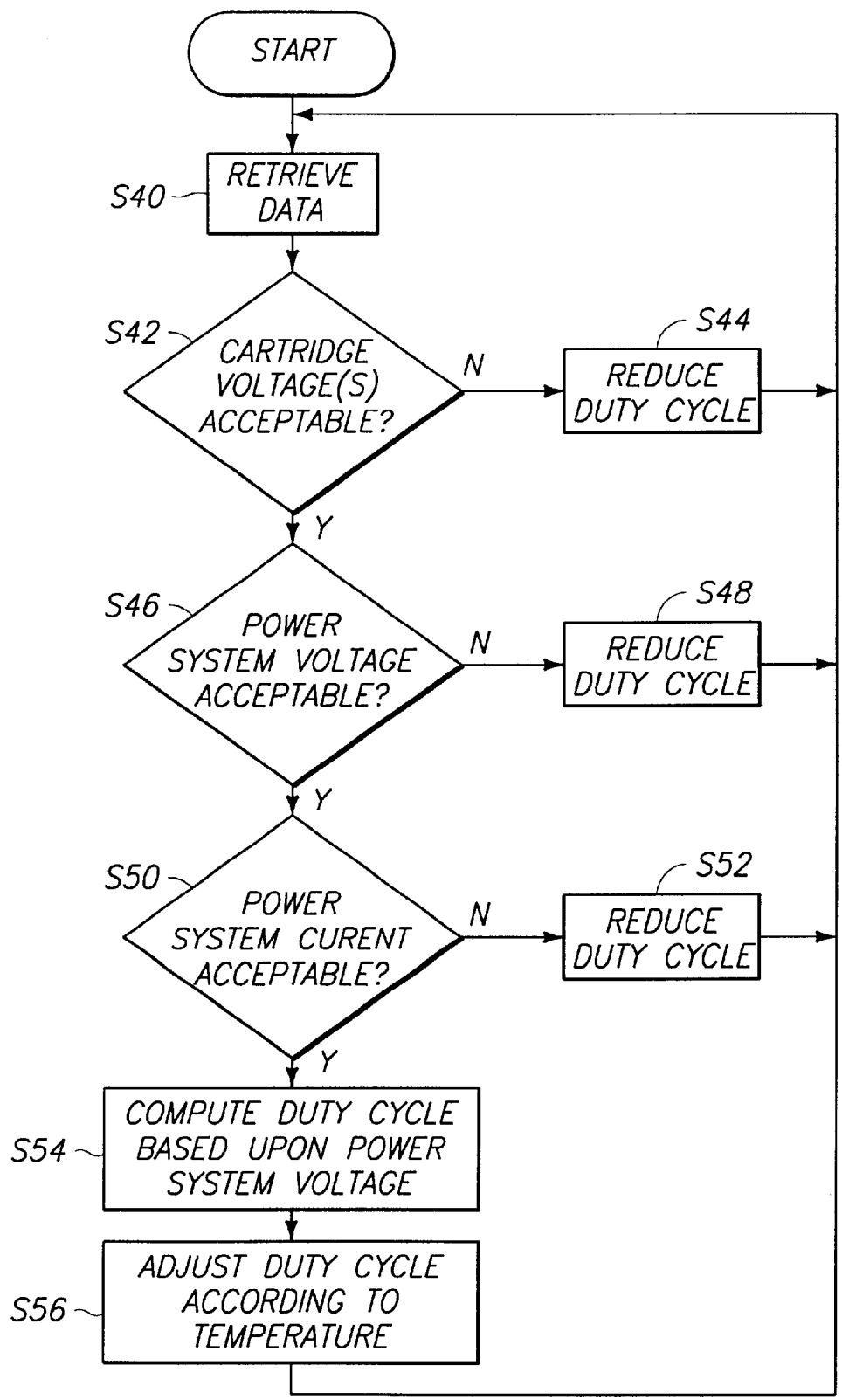
FIG. 13 is a flow chart illustrating exemplary control operations of the power conditioning circuitry of FIG. 10 and FIG. 11.

Referring to FIG. 13, an exemplary methodology for determining appropriate duty cycles for pulse-width modulated control signals generated within controller 102 for control of power conditioning circuitry 100a–100c is described. Such methodology may be implemented within executable code stored within memory 103. Alternatively, such methodology may be implemented in hardware in another configuration. The depicted methodology is utilized for controlling the voltage of fuel cell power system 10 to a certain set point, such as an output voltage from fuel cell power system 10 of approximately 26 Volts. Other control methods are utilized in other embodiments.

Initially, a default duty cycle, such as 50%, is utilized upon startUp operations. Thereafter, the default duty cycle is varied in accordance with the below method.

At step S40, controller 102 receives data regarding operations of fuel cell power system 10. For example, controller 102 retrieves data regarding voltage potentials of individual fuel cell cartridges 14, voltage potential across terminals 62, 63 of fuel cell power system 10, output current supplied to a load coupled with fuel cell power system 10, and temperature information within housing 12 of fuel cell power system 10 and/or temperatures within one or more of fuel cell cartridges 14.

Thereafter, controller 102 proceeds to step S42 to determine whether fuel cell cartridge, voltages are acceptable. Such acceptable voltages are dependant upon the number of fuel cells 90 within a given fuel cell cartridge 14. In a described configuration, an acceptable voltage of a given fuel cell cartridge 14 is greater than approximately 0.6–0.65 Volts per fuel cell.

If the determined cartridge voltage of fuel cell cartridges 14 is unacceptable, controller 102 proceeds to step S44 to reduce a duty cycle. At step S44, controller 102 use an incremental step of approximately one percent to reduce the duty cycle being utilized. Thereafter, controller 102 returns to step S40.

Alternatively, if the condition at step S42 is acceptable, controller 102 proceeds to step S46 and determines whether the fuel cell power system voltage is acceptable. In a series arrangement of twelve fuel cell cartridges 14 individually having four fuel cells 90 per cartridge, an acceptable voltage potential of fuel cell power system 10 is below approximately 30 Volts, for example.

If the fuel cell power system voltage is high, controller 102 proceeds to step S48 to again reduce the duty cycle. In one configuration, controller 102 is configured to reduce the duty cycle by approximately one percent. Thereafter, controller 102 returns to step S40 to retrieve additional data.

Alternatively, if the condition is acceptable at step S46, controller 102 proceeds to step S50 to determine whether an output current of the fuel cell power system 10 is acceptable. For example, a fuel cell power system 10 including twelve serially arranged fuel cell cartridges 14 individually including four fuel cells 90 would have an acceptable maximum current of approximately 85 amps.

If the condition of step S50 is unacceptable, controller 102 proceeds to step S52 to reduce the duty cycle by a predetermined step, such as one percent, and thereafter returns to step S40.

If the condition at step S50 is acceptable, controller 102 proceeds to step S54 to compute the duty cycle based upon the output voltage of fuel cell power system 10. In the described embodiment, a proportional integral algorithm could be utilized to compute the duty cycle based upon the output voltage of fuel cell power system 10.

Thereafter, controller 102 proceeds to step S56 to adjust the calculated duty cycle depending upon the monitored temperature within housing 12 of fuel cell power system 10 or individual fuel cell cartridges 14. For example, controller 102 may subtract one percent from the duty cycle for each degree Celsius above 40° Celsius.

Referring to FIG. 14, exemplary circuitry to enable monitoring of current supplied from fuel cell power system 10 to an attached load 22 is illustrated. The depicted circuitry 140 comprises shunt circuitry 142 and an amplifier 144.

Shunt circuitry 142 is provided within an electrical connection coupled with ground terminal 63 of fuel cell power system 10. Shunt circuitry 142 comprises a 50 mV/400 Amp precision shunt in an exemplary configuration to provide a small voltage proportional to the current. Amplifier 144 is configured to measure the voltage potential across the shunt circuitry 142. Thereafter, amplifier 144 outputs an indication signal to controller 102. The signal outputted from amplifier 144 is provided to an analog-to-digital (A-D) converter. Controller 102 includes analog-to-digital converter circuitry in one configuration. Alternatively, analog-to-digital converter circuitry is implemented as separate circuitry from controller 102.

Referring to FIG. 15, exemplary circuitry 150 for monitoring the output voltage potential of fuel cell power system 10 is illustrated. The depicted circuitry 150 comprises a resistor divider network 153 coupled with output terminals 62, 63. Circuitry 150 additionally includes an amplifier 152 configured to output an indication signal to controller 102 corresponding to the output voltage potential. Exemplary load parameters are approximately 26 Volts and 200 Amps. Resistors of the amplifier configuration are preferably small low power precision resistors. The signal outputted from amplifier 152 is provided to an analog-to-digital converter. Controller 102 includes analog-to-digital converter circuitry in one configuration. Alternatively, analog-to-digital converter circuitry is implemented as separate circuitry from controller 102.

Referring to FIG. 16, exemplary circuitry 160 for monitoring the voltage of a fuel cell cartridge 14 is shown. Depicted circuitry 160 comprises a resistor divider network 163 coupled with fuel cell cartridge 14. The illustrated circuitry 160 additionally includes an amplifier 162 configured to output a signal to controller 102 corresponding to. the. voltage of fuel cell cartridge 14.

Multiplexers (not shown) may be utilized to provide coupling intermediate the individual circuitry 160 of fuel cell cartridges 14 and controller 102. The signal outputted from amplifier 162 is provided to an analog-to-digital converter. Controller 102 includes analog-to-digital converter circuitry in one configuration. Alternatively, analog-todigital converter circuitry is implemented as separate circuitry from controller 102.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A fuel cell power system comprising:
    a plurality of terminals adapted to couple with a load;
    a plurality of fuel cells respectively electrically coupled with the terminals and configured to convert chemical energy into direct current electrical energy having a variable voltage potential, the fuel cells being configured to be individually selectively deactivated and remaining ones of the fuel cells being configured to provide electricity to the terminals with others of the fuel cells deactivated; and
    a converter coupled intermediate the fuel cells and the terminals, the converter being configured to convert the direct current electrical energy having the variable voltage potential into direct current electrical energy having a substantially constant voltage potential.

2. The system according to claim 1 wherein the converter comprises a boost converter.

3. The system according to claim 1 wherein the converter comprises a buck converter.

4. The system according to claim 1 further comprising an inverter coupled with the plurality of fuel cells and configured to convert direct current electrical energy into alternating current electrical energy.

5. The system according to claim I wherein the converter comprises:
    an electrical energy storage device; and
    at least one switch configured to couple at least one fuel cell with the electrical energy storage device.

6. The system according to claim 5 further comprising a controller configured to monitor a voltage potential of the electrical energy storage device and to control the at least one switch responsive to the monitoring.

7. The system according to claim 5 further comprising a controller configured to control the at least one switch to maintain the voltage potential of the electrical energy storage device above a predetermined threshold.

8. The system according to claim 5 further comprising a controller configured to monitor at least one operational parameter of at least one fuel cell power system and to control the switch responsive to the monitoring.

9. The system according to claim 8 wherein the controller is configured to monitor at least one of voltage, current and temperature of at least one fuel cell.

10. The system according to claim 5 further comprising a controller configured to pulse-width modulate a control signal applied to the at least one switch.

11. The system according to claim 1 further comprising:
    a cartridge configured to house at least one fuel cell; and
    a housing configured to receive the cartridge.

12. The system according to claim 11 wherein the cartridge is removably coupled with the housing.

13. The system according to claim 11 wherein the cartridge includes the converter.

14. A fuel cell power system comprising:
    a plurality of terminals adapted to couple with a load;
    a plurality of fuel cells configured to convert chemical energy into direct current electrical energy, the fuel cells being configured to be individually selectively deactivated and remaining ones of the fuel cells being configured to provide electricity with others of the fuel cells deactivated; and
    an inverter coupled intermediate at least one of the fuel cells and the terminals, the inverter being configured to convert the direct current electricity into alternating current electrical energy.

15. The system according to claim 14 further comprising a converter coupled with at least one of the fuel cells and the inverter and configured to convert the direct current electrical energy into direct current electrical energy having a substantially constant voltage potential.

16. A direct current voltage converter comprising:
    an input adapted to receive direct current electrical energy from a plurality of fuel cells having a variable voltage potential;
    converter circuitry coupled with the input and configured to convert the direct current electrical energy having the variable voltage potential into direct current electrical energy having a substantially constant voltage potential; and
    an output coupled with the converter circuitry and configured to receive the direct current electrical energy having the substantially constant voltage, wherein the plurality of fuel cells are configured to be individually selectively deactivated and remaining ones of the fuel cells being configured to provide electricity to the input with others of the fuel cells deactivated.

17. The converter according to claim 16 wherein the converter circuitry comprises:
    an electrical energy storage device; and
    a switch configured to couple the input with the electrical energy storage device.

18. The converter according to claim 17 further comprising a controller configured to monitor a voltage potential of the electrical energy storage device and to control the switch responsive to the monitoring.

19. The converter according to claim 17 further comprising a controller configured to control the switch to maintain the voltage potential of the electrical energy storage device above a predetermined threshold.

20. A fuel cell power system comprising:
    a housing;
    a plurality of output terminals;
    a plurality of cartridges configured to be selectively received within and removed from the housing and individually comprising:
        a fuel cell configured to convert chemical energy into electrical energy; and
        power conditioning circuitry configured to electrically condition the electrical energy; and
        an electrical connection configured to couple the power conditioning circuitry with the output terminals.

21. The system according to claim 20 wherein the cartridge is removably coupled with the housing.

22. The system according to claim 20 wherein the at least one cartridge comprises a plurality of cartridges.

23. The system according to claim 20 wherein the power conditioning circuitry comprises DC-DC converter circuitry.

24. The system according to claim 20 wherein the power conditioning circuitry comprises inverter circuitry.

25. The system according to claim 20 wherein the power conditioning circuitry comprises:
- an electrical energy storage device; and
- a switch configured to couple the fuel cell with the electrical energy storage device.

26. The system according to claim 25 further comprising a controller configured to monitor at least one operational parameter of the fuel cell power system and to control the switch responsive to the monitoring.

27. The system according to claim 26 wherein the controller is configured to monitor at least one of voltage, current and temperature of the fuel cell.

28. The system according to claim 25 further comprising a controller configured to pulse-width modulate. a control signal applied to the switch.

29. A fuel cell power system comprising:
- a fuel cell configured to convert chemical energy into electrical energy and to be selectively deactivated, and wherein a cartridge is configured to house the fuel cell, and a housing is provided and which is configured to receive the cartridge; and
- power conditioning circuitry coupled with the fuel call and configured to electrically condition the electrical energy, the power conditioning circuitry comprising a controller configured to monitor an operational parameter of the fuel call power system, and to control the conditioning of the electrical energy responsive to the monitoring, and wherein the power conditioning circuitry is provided within the cartridge.

30. A fuel cell power system comprising:
- a housing;
- a plurality of terminals adapted to couple with a load;
- a plurality of cartridges, removeably supported by the housing, and wherein each cartridge includes at least one fuel cell which is configured to convert chemical energy into direct current energy having a variable voltage potential; and
- a plurality of power conditioning circuits coupled with the fuel cell and configured to increase the voltage of the electrical energy from the fuel cell, and wherein the fuel cell cartridges house the respective power conditioning circuits.

31. A fuel cell power system, comprising:
- a housing;
- a plurality of terminals adapted to couple with a load;
- a plurality of cartridges, removably supported by the housing, and wherein each of the cartridges include at least one fuel cell which is configured to convert chemical energy into direct current electrical energy having a variable voltage potential; and
- a plurality of power conditioning circuits which are individually configured to couple with the at least one fuel cell and to increase the voltage of the electrical energy from the at least one fuel cell.

32. A fuel cell power system comprising:
- a housing;
- a plurality of terminals adapted to couple to a load;
- a plurality of cartridges which are removably supported by the housing, and wherein each cartridge includes at least one fuel cell which is configured to convert chemical energy into direct current energy having a variable voltage potential; and
- a plurality of power conditioning circuits coupled in parallel with the terminals.

33. A fuel cell power system comprising:
- a plurality of terminals adapted to couple with a load;
- a plurality of fuel cells configured to convert chemical energy into electrical energy and to provide the electrical energy to the terminals, the fuel cells being further configured to be individually selectively deactivated and remaining ones of the fuel cells being configured to provide electricity to the terminals with others of the fuel cells deactivated; and
- a plurality of power conditioning circuits electrically coupled with respective fuel cells and configured to condition electrical energy from respective fuel cells.

34. The system according to claim 33 further comprising a plurality of fuel cell cartridges individually comprising at least one of the fuel cells.

35. The system according to claim 34 wherein the fuel cell cartridges individually comprise a plurality of the fuel cells.

36. The system according to claim 34 wherein the fuel cell cartridges house respective power conditioning circuits.

37. The system according to claim 33 wherein the power conditioning circuits comprise boost converters.

38. The system according to claim 33 wherein the power conditioning circuits comprise buck converters.

39. The system according to claim 33 wherein the power conditioning circuits are coupled in parallel with the terminals.

40. A fuel cell power system comprising:
- a plurality of terminals adapted to couple with a load;
- a plurality of fuel cell cartridges individually comprising at least one fuel cell which is configured to convert chemical energy into electrical energy, and wherein the fuel cell cartridges are coupled in parallel with the terminals; and
- a plurality of power conditioning circuits configured to condition the electrical energy generated by the respective fuel cell cartridges.

41. A power conditioning method comprising:
- receiving direct current electrical energy having a variable voltage potential within a direct current converter from a plurality of fuel cells configured to convert chemical energy into electricity, the fuel cells being configured to be individually selectively deactivated and remaining ones of the fuel cells being configured to provide electricity with others of the fuel cells deactivated;
- converting the direct current electrical energy having the variable voltage potential into direct current electrical energy having a substantially constant voltage potential using the direct current converter; and
- outputting the direct current electrical energy having the substantially constant voltage potential.

42. The method according to claim 41 wherein the converting comprises storing the electrical energy having the variable voltage potential using an electrical energy storage device.

43. The method according to claim 41 wherein the converting comprises:
- monitoring a voltage potential of an electrical energy storage device; and
- applying the electrical energy having the variable voltage potential to the electrical energy storage device responsive to the monitoring.

44. The method according to claim 43 wherein the applying comprises maintaining a voltage potential of the electrical energy storage device above a predetermined threshold.

45. A fuel cell power generation method comprising:
providing a plurality of fuel cells, the fuel cells being configured to be individually selectively deactivated and remaining ones of the fuel cells being configured to provide electricity with others of the fuel cells deactivated;
converting chemical energy into electrical energy using the fuel cells;
conditioning the electrical energy;
monitoring an operational parameter of the fuel cells; and
controlling the conditioning responsive to the monitoring.

46. The method according to claim 45 wherein the conditioning comprises supplying electrical energy to an electrical energy storage device.

47. The method according to claim 46 wherein the controlling comprises controlling the supplying.

48. The method according to claim 45 wherein the monitoring comprises monitoring the operational parameter comprising at least one of voltage, current and temperature of the fuel cells.

49. A fuel cell power generation method, comprising:
providing a plurality of fuel cells;
converting chemical energy to electrical energy using the fuel cells;
increasing the voltage potential of the electrical energy from the plural fuel cells by using a plurality of power conditioning circuits coupled in parallel with the terminals; and
after the increasing, supplying the electrical energy to a plurality of terminals which are adapted to be coupled to a load.

50. A fuel cell power generation method comprising:
providing a plurality of fuel cells;
converting chemical energy to electrical energy using the fuel cells;
increasing the voltage potential of the electrical energy generated from the plural fuel cells using a plurality of power conditioning circuits corresponding to the respective fuel cells; and
after the increasing, supplying the electrical energy to a plurality of terminals which are adapted to be coupled to a load.

51. A fuel cell power generation method comprising:
providing a plurality of fuel cells;
converting chemical energy to electrical energy using the fuel cells;
conditioning the electrical energy using a plurality of power conditioning circuits corresponding to respective fuel cells; and
supplying the electrical energy to a plurality of terminals adapted to be coupled to a load after the conditioning.

52. The method according to claim 51 wherein the providing comprises providing a plurality of fuel cell cartridges individually comprising at least one of the fuel cells.

53. The method according to claim 51 wherein the providing comprises providing a plurality of fuel cell cartridges individually comprising plural fuel cells.

54. The method according to claim 51 wherein the providing comprises providing a plurality of fuel cell cartridges individually including at least one of the fuel cells and at least one power conditioning circuit.

55. The method according to claim 51 wherein the supplying comprises supplying using the power conditioning circuits coupled in parallel with the terminals.

56. The method according to claim 51 wherein the conditioning comprises. increasing the voltage potential of the electrical energy.

57. A fuel cell power generation method comprising:
providing a plurality of fuel cell cartridges individually including at least one fuel cell;
converting chemical energy into electrical energy utilizing the fuel cells;
conditioning the electrical energy by utilizing a plurality of power conditioning circuits corresponding to the respective fuel cell cartridges; and
supplying the electrical energy using the fuel cell cartridges and which are coupled in parallel to a plurality of terminals which are electrically coupled to a load.

* * * * *

UNITED STATES PATENT AND TRADEMARK OFFICE
CERTIFICATE OF CORRECTION

PATENT NO. : 6,428,918 B1
DATED : August 6, 2002
INVENTOR(S) : William A. Fuglevand et al.

It is certified that error appears in the above-identified patent and that said Letters Patent is hereby corrected as shown below:

Column 1,
Line 50, replace "is proton exchange membrane (electrolyte)." with -- proton exchange membrane (electrolyte). --

Column 6,
Line 45, replace "fuel supply 23 to 10 supply fuel to fuel cell cartridges 14." with
-- fuel supply 23 to supply fuel to fuel cell cartridges 14. --
Line 46, replace "Exemplary fuel comprises 11 hydrogen gas in the described" with
-- Exemplary fuel comprises hydrogen gas in the described --

Column 7,
Line 37, replace "to, respective fuel cell cartridges 14. Responsive to the" with
-- to respective fuel cell cartridges 14. Responsive to the --
Line 62, replace "30 using element control circuitry 41 to either. increase. or" with
-- 30 using element control circuitry 41 to either increase or --
Line 63, replace "decrease the temperature of air present, within plenum 51." with
-- decrease the temperature of air present within plenum 51. --

Column 8,
Line 21, replace "of air passage 56 can preferably be provided in a plurality." with
-- of air passage 56 can preferably be provided in a plurality --

Column 9,
Line 12, replace "Following a start-up condition. either. inputted via"
with -- Following a start-up condition either inputted via --
Line 13, replace "or from remote device 24, control system 30."
with -- or from remote device 24, control system 30 --
Line 40, replace "can be derived from electrical power generated from: fuel" with
-- can be derived from electrical power generated from fuel --
Lines 41 and 42, replace "provided to selectively: charge batteries of power supply 32"
with -- provided to selectively charge batteries of power supply 32 --

UNITED STATES PATENT AND TRADEMARK OFFICE
CERTIFICATE OF CORRECTION

PATENT NO. : 6,428,918 B1
DATED : August 6, 2002
INVENTOR(S) : William A. Fuglevand et al.

It is certified that error appears in the above-identified patent and that said Letters Patent is hereby corrected as shown below:

Column 10,
Line 28, replace "air from plenum 51 to circulate to. the cathode side of the" with
-- air from plenum 51 to circulate to the cathode side of the --
Line 29, replace "membrane electrode diffusion assembly contained so within" with
-- membrane electrode diffusion assembly contained within --
Line 63, replace "wall 80 14, and are operable to matingly couple in fluid" with
-- wall 80 and are operable to matingly couple in fluid --

Column 12,
Line 40, replace "responsive to such monitoring in the, described" with
-- responsive to such monitoring in the described --

Column 13,
Line 55, replace "Converter circuitry 108 in configured to couple" with
-- Converter circuitry 108 is configured to couple --

Column 14,
Line 22, replace "27 Volts, controller 102 turns; switch, 114 on to charge" with
-- 27 Volts, controller 102 turns switch 114 on to charge --

Column 15,
Line 30, replace "step S24 to turn off witch 114." with
-- step S24 to turn off switch 114. --

Column 16,
Line 44, replace "Referring to FIG. 11, power conditioning circuitry 100*a*" with
-- Referring to FIG. 11, power conditioning circuitry 100*b* --
Line 51, replace "an output current which is less than a received a input" with
-- an output current which is less than a received input --

Column 19,
Line 37, replace "The system according to claim I wherein the converter" with
-- The system according to claim 1 wherein the converter --

UNITED STATES PATENT AND TRADEMARK OFFICE
CERTIFICATE OF CORRECTION

PATENT NO. : 6,428,918 B1
DATED : August 6, 2002
INVENTOR(S) : William A. Fuglevand et al.

It is certified that error appears in the above-identified patent and that said Letters Patent is hereby corrected as shown below:

Column 21,
Line 22, replace "power conditioning circuitry coupled with the fuel call" with
-- power conditioning circuitry coupled with the fuel cell --
Line 26, replace "of the fuel call power system, and to control the" with
-- of the fuel cell power system, and to control the --

Signed and Sealed this

Twelfth Day of August, 2003

JAMES E. ROGAN
*Director of the United States Patent and Trademark Office*